US008744821B2

(12) United States Patent
Oh

(10) Patent No.: US 8,744,821 B2
(45) Date of Patent: *Jun. 3, 2014

(54) SPREADSHEET-BASED TEMPLATES FOR SUPPORTING THE SYSTEMS ENGINEERING PROCESS

(75) Inventor: Kong Ping Oh, Troy, MI (US)

(73) Assignee: Xldyn, LLC, Brighton, MI (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/217,223

(22) Filed: Aug. 24, 2011

(65) Prior Publication Data

US 2013/0013993 A1    Jan. 10, 2013

Related U.S. Application Data

(60) Provisional application No. 61/505,356, filed on Jul. 7, 2011.

(51) Int. Cl.
*G06G 7/48* (2006.01)

(52) U.S. Cl.
USPC .............................................. 703/6; 715/212

(58) Field of Classification Search
USPC .............................................. 703/6; 715/212
See application file for complete search history.

(56) References Cited

U.S. PATENT DOCUMENTS

| | | | |
|---|---|---|---|
| 6,535,861 B1 | 3/2003 | O'Connor et al. | |
| 6,779,151 B2 | 8/2004 | Cahill et al. | |
| 6,883,161 B1 * | 4/2005 | Chovin et al. | 717/109 |
| 7,490,031 B1 | 2/2009 | Qiu | |
| 7,624,372 B1 | 11/2009 | Stewart | |
| 2006/0101391 A1 | 5/2006 | Ulke et al. | |
| 2006/0112123 A1 * | 5/2006 | Clark et al. | 707/101 |
| 2006/0282818 A1 | 12/2006 | DeSpain | |
| 2008/0256508 A1 | 10/2008 | Jonsson | |
| 2009/0241089 A1 | 9/2009 | Ramamoorthy et al. | |

OTHER PUBLICATIONS

El-Hajj, Ali et al., "On Using Spreadsheets for Logic Networks Simulation", Nov. 1998, IEEE Transactions on Education, vol. 41, No. 4, IEEE.*
InterCax,"ParaMagic v16.6 sp1 Users Guide", Sep. 9, 2010, InterCax LLC.*
Sparx Systems Pty. Ltd., SysML MDG Technology, available at http://www.sparxsystems.com/products/mdg/tech/sysml/index.html. Retrieved Aug. 27, 2011.
No Magic, Inc., MagicDraw: Architecture Made Simple, available at https://www.magicdraw.com/sysml. Retrieved Aug. 27, 2011.
Altova, SysML for Embedded Systems Modeling, available at http://www.altova.com/umodel/sysml.html. Retrieved Aug. 27, 2011.

(Continued)

*Primary Examiner* — Kamini S Shah
*Assistant Examiner* — Cedric D Johnson
(74) *Attorney, Agent, or Firm* — Condo Roccia Koptiw LLP

(57) ABSTRACT

A spreadsheet environment is used as a graphical user interface (GUI) for depicting and interacting with the various aspects of a system. In particular, the spreadsheet environment supports using OMG SysML to model a system, and to execute tasks associated with the systems engineering process. The spreadsheet environment also supports the use of pre-defined templates whose contents and features are common to a multiplicity of projects that a company or company unit may undertake, and which can be made specific or modified based on a project's needs.

24 Claims, 32 Drawing Sheets

(56) References Cited

OTHER PUBLICATIONS

IBM, Rational Rhapsody Developer, available at http://www-01.ibm.com/software/rational/products/rhapsody/developer/. Retrieved Aug. 27, 2011.

Atego, Artisan Studio, available at http://www.atego.com/products/artisan-studio/. Retrieved Aug. 27, 2011.

Embedded Plus Engineering, What is OMG SysML?, available at http://www.atego.com/products/artisan-studio/. Retrieved Aug. 27, 2011.

IBM, Rational Software Architect Family, available at http://www-01.ibm.com/software/awdtools/swarchitect. Retrieved Aug. 27, 2011.

No Magic, Inc., Cameo Simulation Toolkit, available at http://www.magicdraw.com/simulation. Retrieved Aug. 27, 2011.

Intercax LLC, SysML and MBSE Training, available at http://www.intercax.com/services/sysml-mbse-training/. Retrieved Aug. 27, 2011.

El-Hajj, Ali et al., "On Using Spreadsheets for Logic Networks Simulation," Nov. 1998, IEEE Transactions on Education, vol. 41, No. 4.

Bluttman, Ken et al., "Microsoft Office Excel 2007 Formulas & Functions for Dummies," 2007, Wiley Publishing, Inc., pp. 38-39, 46, 48, 75.

PlanMaker, "Manual: PlanMaker 2006," 2006, SoftMaker Software GmbH, pp. 19, 245-246.

El-Hajj, Ali et al., "A Spreadsheet Simulation of Logic Networks," Feb. 1991, IEEE Transactions on Education, vol. 34, No. 1.

Bissett, Brian D., "Automated Data Analysis Using Excel," 2007, Taylor & Francis Group, LLC, pp. 175-178.

U.S. Appl. No. 12/967,360, filed Dec. 14, 2010, Kong Ping Oh.
U.S. Appl. No. 12/972,042, filed Dec. 17, 2010, Kong Ping Oh.
U.S. Appl. No. 13/040,417, filed Mar. 4, 2011, Kong Ping Oh.

* cited by examiner

SPREADSHEET-BASED TEMPLATES FOR SUPPORTING THE SYSTEMS ENGINEERING PROCESS

TECHNICAL BACKGROUND

The disclosure relates generally to computer-implemented templates used in modeling, simulation, and analysis of systems. More particularly, the disclosure relates to pre-defined user interfaces for modeling, simulating, and analyzing systems using a systems engineering process.

BACKGROUND

Systems Engineering (SE) is a disciplined process for developing products. Systems Engineering involves a number of sub-processes, which can be characterized as SE Management Processes or SE Technical Processes. SE Management Processes include project and resource planning, project review, and change control. SE Technical Processes include gathering customer input, defining product requirements and use scenarios, performing trade-off studies based on available technology and tools, and validating the design using established test and simulation plans. A variety of tools are available that support both SE Management Processes and SE Technical Processes. Some are meant for large enterprises with complicated products and product lines, while others are targeted at small businesses with a relatively small number of engineers and/or simpler product structure. Regardless of the target users a good SE tool should have an easy-to-use graphical interface to model the product or system. It should also have a model repository for persisting and managing product information, state of requirements, supporting change control and issue management, and allowing data entered in one view to be reflected in other views. A good SE tool should also seamlessly integrate models with tools used for performance evaluation, trade-off studies, and parameter optimization.

Some tools, hereafter called Integrated Systems Engineering Environments (ISEEs), integrate modeling, data management, and simulation capabilities into one seamless environment. For exchanging information with the larger SE community, a good ISEE should also follow community standards where available. For Technical Processes, OMG SysML is a standardized language for depicting different product aspects in the forms of diagrams. Those diagrams include, for example, a block definition diagram for depicting how the constituent parts are associated, a requirements diagram for how the product is expected to perform, and an internal block diagram, which shows the internal working of the product, e.g., how information flows between model elements.

An example block definition diagram 200 is shown in FIG. 2. OMG SysML standards include abstract syntax, which defines the concepts in the language and how they are related, and concrete syntax, which specifies, e.g., what shapes to use for different diagram elements (rectangles 202, arrowheads 204, line styles, etc.), special delimiters and keywords, e.g., <<block>>, as well as acceptable abbreviation (bdd for block definition diagram). In addition to diagrams, the OMG SysML language also specifies tables, matrices and trees for depicting allocation and hierarchical relationships. OMG SysML specifications are available at http://www.sysml.org.

Commercial products are available for modeling systems using the various diagram types specified in the OMG SysML language. Plug-ins to those products provide additional functionalities not specified by OMG SysML. Some plug-ins, for example, can validate system behavior by executing the models depicted in an activity diagram. Co-pending U.S. patent application Ser. No. 13/040,417, entitled "Spreadsheet-Based Graphical User Interface for Modeling of Products Using the Systems Engineering Process," filed Mar. 4, 2011, the disclosure of which is incorporated herein by reference in its entirety, discloses a spreadsheet-based graphical user interface that not only complies with the OMG SysML specifications but also provides significant additional analytical functionalities.

SUMMARY OF THE DISCLOSURE

According to various example embodiments, a spreadsheet environment is used as a graphical user interface for depicting and interacting with the various aspects of a system. In particular, the spreadsheet environment supports the use of pre-defined Systems Engineering templates that leverage the integration of OMG SysML diagrams with the graphical, analytical, computational, and customization capabilities of a spreadsheet environment to execute tasks associated with the systems engineering process.

For application to a specific domain, the content of a system model can be pre-defined based on best practice. In this disclosure, the term template means a workbook with contents that are pre-defined based on best practice of a practice group, i.e. an industry, a company, or a unit of a company. Such a workbook is authored by a few experts in the practice group, and made available, often under revision control, for use by other members of the group. A template workbook may include models of products and processes to the extent supported by SysML, and methods, models and interfaces that support the systems engineering process, e.g. those used in the evaluation of measure of effectiveness, requirements tracking, process automation, and optimization. The template can be modified by a project team based on its specific needs.

One embodiment is directed to a method of modeling a system comprising a plurality of components, the content of which is pre-defined based on the domain of application. For example, the contents will be different if the system engineering methodology is applied to automotive products than if the methodology is applied to the chemical process industry. A computer is used to provide a spreadsheet environment. Shape objects are defined within the spreadsheet environment. The shape objects represent the components of the system. At least one component is a subsystem comprising a plurality of elements. The spreadsheet environment is used to interact with a plurality of applications for working with the system and to generate a plurality of diagrams of the system in a graphical system modeling language, such as OMG SysML. The spreadsheet environment is used to diagram a plurality of system models for dynamic system simulation, process automation, and performance index calculations. A macro in the spreadsheet environment is used to perform at least one action on at least one of the system models. The system model is stored using a templated workbook in the spreadsheet environment, and can be used to simulate the system's behavior. The templated workbook includes data representing a physical view and a functional view of the system model. This method may be implemented in a computer system.

Another embodiment is directed to a method of modeling a system comprising a plurality of components. The method involves using a computer to provide a spreadsheet environment. A plurality of shape objects are defined within the spreadsheet environment. The shape objects represent the components of the system. At least one component is a subsystem comprising a plurality of elements. The spreadsheet environment is used to interact with a plurality of applications for working with the system and to generate a plurality of diagrams of the system in a graphical system modeling language. The spreadsheet environment is used to diagram a plurality of system models for dynamic system simulation, process automation, and performance index calculations. A macro in the spreadsheet environment is used to perform at least one action on at least one of the system models. The system model is stored using a templated master workbook in the spreadsheet environment. The templated master workbook comprises a plurality of worksheets. A user selection of the templated master workbook and a worksheet of the plurality of worksheets is received. The selected worksheet is copied to a client workbook. This method may be implemented in a computer system.

For deployment in an enterprise, where models and data are shared by many people, it is necessary to store system information in a location that is accessible by the entire community. One embodiment is directed to a method for persisting a template and its instances in a database, and for providing controlled access for the purpose of creating, viewing, or updating workbook contents either in parts or as a whole.

Another embodiment is directed to a method for transforming OMG SysML diagram contents into Unified Modeling Language (UML) and from UML into data models needed in database design. After the database is deployed it can be populated by several methods. One such method is by using a spreadsheet environment in conjunction with macros written to insert simulation results into tables returned by database queries.

Because the spreadsheet environments are ubiquitous in the worlds of engineering and information technology, learning it as a tool will be relatively easy for systems engineering practitioners. More importantly, since OMG SysML diagrams are done with shapes in a spreadsheet environment, integration of those diagrams with other objects in the spreadsheet environment, such as pivot tables, cells, charts, hyperlinks, refedits, etc., provides a powerful combination that will improve an engineer's productivity. From a development viewpoint, using a spreadsheet environment as a platform allows the leverage of technology out of the box, such as security protection, privacy control, etc., that are common to Microsoft's OFFICE® productivity suite. Finally, developers can leverage the interoperability between the EXCEL® spreadsheet environment and the .Net framework, including Microsoft's Windows Communication Foundation and Windows Presentation Foundation, to provide attractive and effective user interfaces. The use of templates reduces the work of engineers, facilitates the use of best practices, and promotes uniformity of method application within the a company or company unit.

DESCRIPTION OF VARIOUS EMBODIMENTS

According to various embodiments, a spreadsheet environment, such as Microsoft's EXCEL® spreadsheet environment or OpenOffice.org Calc, is used as a graphical user interface (GUI) for depicting and interacting with the various aspects of a system. In particular, the spreadsheet environment supports using OMG SysML to model a system, and to execute tasks associated with the systems engineering process. The spreadsheet environment also supports the use of pre-defined templates whose contents and features are common to a multiplicity of projects that a company or company unit may undertake, and which can be made specific or modified based on a project's needs.

Figure 1:
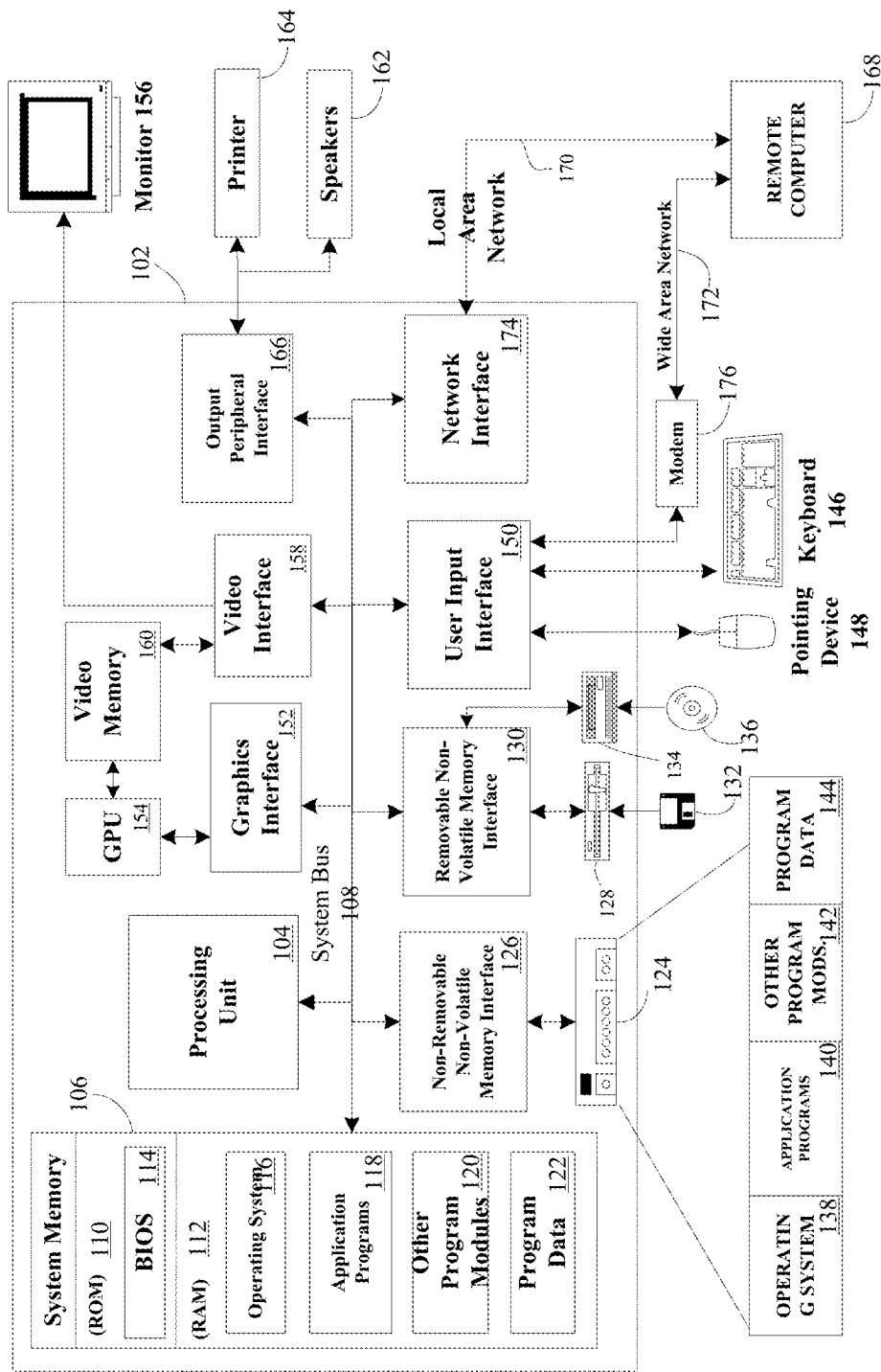
FIG. 1 is a block diagram illustrating a computer system that can be programmed to implement various embodiments.
Figure 2:
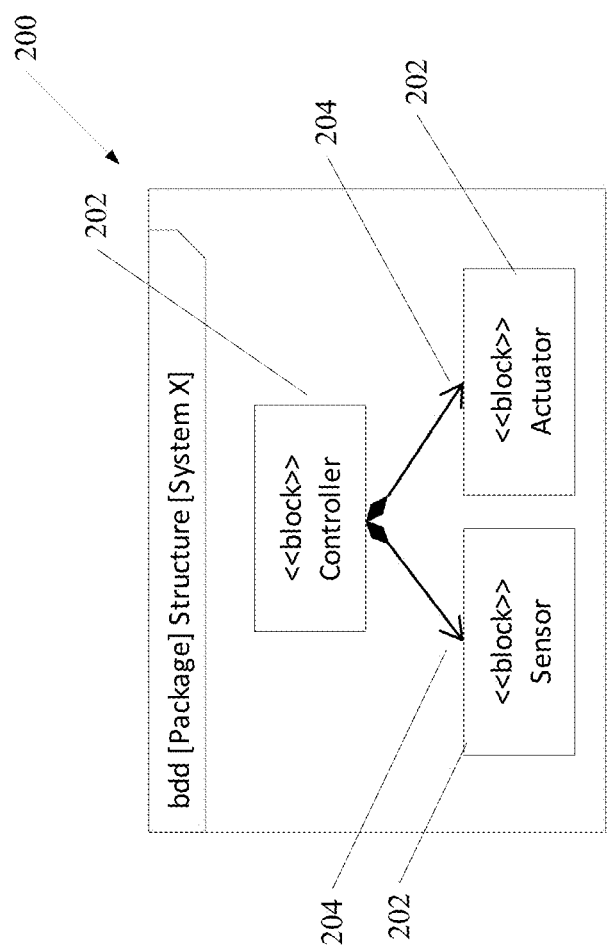
FIG. 2 is a diagram illustrating a conventional block definition diagram used in connection with a systems modeling language.

Referring now to the drawings, FIG. 1 is a block diagram illustrating a computer system 100 that can be programmed to implement various embodiments described herein. The computer system 100 is only one example of a suitable computing environment and is not intended to suggest any limitation as to the scope of use or functionality of the subject matter described herein. The computer system 100 should not be construed as having any dependency or requirement relating to any one component or combination of components shown in FIG. 1.

The computer system 100 includes a general computing device, such as a computer 102. Components of the computer 102 may include, without limitation, a processing unit 104, a system memory 106, and a system bus 108 that communicates data between the system memory 106, the processing unit 104, and other components of the computer 102. The system bus 108 may incorporate any of a variety of bus structures including a memory bus or memory controller, a peripheral bus, and a local bus using any of a variety of bus architectures. These architectures include, without limitation, Industry Standard Architecture (ISA) bus, Enhanced ISA (EISA) bus, Micro Channel Architecture (MCA) bus, Video Electronics Standards Association (VESA) local bus, and Peripheral Component Interconnect (PCI) bus, also known as Mezzanine bus.

The computer 102 also is typically configured to operate with one or more types of processor readable media or computer readable media, collectively referred to herein as "processor readable media." Processor readable media includes any available media that can be accessed by the computer 102 and includes both volatile and non-volatile media, and removable and non-removable media. By way of example, and not limitation, processor readable media may include storage media and communication media. Storage media includes both volatile and non-volatile, and removable and non-removable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the computer 102. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor readable media.

The system memory 106 includes computer storage media in the form of volatile memory, non-volatile memory, or both, such as read only memory (ROM) 110 and random access memory (RAM) 112. A basic input/output system (BIOS) 114 contains the basic routines that facilitate the transfer of information between components of the computer 102, for example, during start-up. The BIOS 114 is typically stored in ROM 110. RAM 112 typically includes data, such as program modules, that are immediately accessible to or presently operated on by the processing unit 104. By way of example, and not limitation, FIG. 1 depicts an operating system 116, application programs 118, other program modules 120, and program data 122 as being stored in RAM 112.

The computer 102 may also include other removable or non-removable, volatile or non-volatile computer storage media. By way of example, and not limitation, FIG. 1 illustrates a hard disk drive 124 that communicates with the system bus 108 via a non-removable memory interface 126 and that reads from or writes to a non-removable, non-volatile magnetic medium, a magnetic disk drive 128 that communicates with the system bus 108 via a removable memory interface 130 and that reads from or writes to a removable, non-volatile magnetic disk 132, and an optical disk drive 134 that communicates with the system bus 108 via the interface 130 and that reads from or writes to a removable, non-volatile optical disk 136, such as a CD-RW, a DVD-RW, or another optical medium. Other computer storage media that can be used in connection with the computer system 100 include, but are not limited to, flash memory, solid state RAM, solid state ROM, magnetic tape cassettes, digital video tape, etc.

The devices and their associated computer storage media disclosed above and illustrated in FIG. 1 provide storage of computer readable instructions, data structures, program modules, and other data that are used by the computer 102. In FIG. 1, for example, the hard disk drive 124 is illustrated as storing an operating system 138, application programs 140, other program modules 142, and program data 144. These components can be the same as or different from the operating system 116, the application programs 118, the other program modules 120, and the program data 122 that are stored in the RAM 112. In any event, the components stored by the hard disk drive 124 are different copies from the components stored by the RAM 112.

A user may enter commands and information into the computer 102 using input devices, such as a keyboard 146 and a pointing device 148, such as a mouse, trackball, or touch pad. Other input devices, which are not shown in FIG. 1, may include, for example, a microphone, a joystick, a game pad, a satellite dish, a scanner, a camera, or the like. These and other input devices may be connected to the processing unit 104 via a user input interface 150 that is connected to the system bus 108. Alternatively, input devices can be connected to the processing unit 104 via other interface and bus structures, such as a parallel port, a game port, or a universal serial bus (USB).

A graphics interface 152 can also be connected to the system bus 108. One or more graphics processing units (GPUs) 154 may communicate with the graphics interface 152. A monitor 156 or other type of display device is also connected to the system bus 108 via an interface, such as a video interface 158, which may in turn communicate with video memory 160. In addition to the monitor 156, the computer system 100 may also include other peripheral output devices, such as speakers 162 and a printer 164, which may be connected to the computer 102 through an output peripheral interface 166.

The computer 102 may operate in a networked or distributed computing environment using logical connections to one or more remote computers, such as a remote computer 168. The remote computer 168 may be a personal computer, a server, a router, a network PC, a peer device, or another common network node, and may include many or all of the components disclosed above relative to the computer 102. The logical connections depicted in FIG. 1 include a local area network (LAN) 170 and a wide area network (WAN) 172, but may also include other networks and buses. Such networking environments are common in homes, offices, enterprise-wide computer networks, intranets, and the Internet.

When the computer 102 is used in a LAN networking environment, it may be connected to the LAN 170 through a wired or wireless network interface or adapter 174. When used in a WAN networking environment, the computer 102 may include a modem 176 or other means for establishing communications over the WAN 172, such as the Internet. The modem 176 may be internal or external to the computer 102 and may be connected to the system bus 108 via the user input interface 150 or another appropriate component. The modem 176 may be a cable or other broadband modem, a dial-up modem, a wireless modem, or any other suitable communication device. In a networked or distributed computing environment, program modules depicted as being stored in the computer 102 may be stored in a remote memory storage device associated with the remote computer 168. For example, remote application programs may be stored in such a remote memory storage device. It will be appreciated that the network connections shown in FIG. 1 are exemplary and that other means of establishing a communication link between the computer 102 and the remote computer 168 may be used.

Installation of XLSE Add-In

According to various example embodiments, a spreadsheet environment, such as Microsoft's EXCEL® spreadsheet environment or OpenOffice.org Calc, is used as a graphical user interface (GUI) for depicting and interacting with various aspects of a product. An add-in that provides additonal features and functionalities, hereafter called the XLSE add-in, enables the EXCEL® spreadsheet environment to serve as an SE tool interface. The XLSE add-in can be written, for example, in Visual Basic for Applications (VBA), the macro editor shipped with every copy of the EXCEL® spreadsheet environment. Alternatively, the XLSE add-in can be developed using Microsoft Visual Studio (VS), which is integrated with the EXCEL® spreadsheet environment. Practitioners skilled in VBA or VS should be familiar with how the macros, scripts, and other language elements are constructed, packaged, and deployed to the user desktop. In addition, templates may be installed in each workbook that uses the XLSE add-in to store static information that is common to XLSE usages, such as version numbers and default values for simulation parameters. Templates may also be used to reduce coding in setting the appearance of commonly used worksheets. In the EXCEL® spreadsheet environment, such templates have the .xltx or .xltm file extensions. Those of ordinary skill in the art are familiar with how to prepare and deploy such templates.

In addition to the aforementioned uses, templates may also include contents and features that depend on the domain of systems engineering application. Such contents and features may be prepared manually and stored as static objects in a spreadsheet environment, or be created dynamically with macros that are stored in a template file. Templated contents, features, and macros may be edited to suit a project's specific needs.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Integrated Systems Engineering Environment (ISEE) Compared to Other System Types Spreadsheets have been used as a graphical user interface (GUI) for many purposes, including building applications, modeling workflow, modeling business processes, and modeling and simulating dynamic systems. Unlike these conventional applications, however, various embodiments described herein use a spreadsheet environment, such as the EXCEL® spreadsheet environment or OpenOffice.org Calc, as a GUI of an ISEE.

Modeling and simulating a technical system differs substantially from simulating workflows, performing business analytics, and modeling and simulating dynamic systems in a number of ways. For example, the objective of simulating a dynamic system is to mimic the behavior of related physical or logical entities over time. This may be done, for example, to support system design and validation. Business analytics applications are concerned with collecting data over time, and do not mimic the behavior of systems having physical or logical components. Business analytics are often used in support of business decisions, such as when to buy or sell a stock or when to replenish a supply or a resource. Workflow simulators mimic the flow of work from one station to another in which human or machines are often involved, but the stations are generally not assumed to have characteristics or behaviors that change over time. Example applications of workflow simulators include, for example, calculating throughput, identifying bottlenecks in a workflow, and optimizing resource consumption.

In contrast with dynamic systems, business analytics, and workflows, an ISEE is intended to support product development at the system through component levels. For example, using an ISEE, a systems engineer can decompose the functional requirements of a product and map them to the subsystems of candidate concept designs. High level design principles such as axiomatic design can be applied during this stage to improve performance robustness. Other factors, including cost and market segmentation, are often taken into account at this time. The system engineer can down-select to one or two design concepts by performing trade-off studies at the system level, and pass the concepts to a team of engineers for further development, including design drawing, detailing, performance simulation, and test. Alternatively, using set-based concurrent engineering, the system engineer may postpone concept down-selection and let several groups work on development issues at the same time as they converge on a solution. Performance scope can include various aspects of a product, ranging from noise and fuel economy that can be calculated by dynamic systems simulators, to perceived quality that can be determined by neural network modeling, to fit and finish that can be assessed by observation. Often the ISEE is used to support decisions while resolving conflicts among competing requirements. The model hierarchy in an ISEE should support drill down. For example, starting at the system level, the user should be able to view the requirement status (e.g., red, yellow, or green) in progressively increasing levels of detail. For instance, if the ISEE indicates that the requirement status of the system as a whole is red—meaning that requirements have not been met—the user should be able to see which subsystems or performance indicators cause the system's requirement status to be indicated as red. Similarly, if the ISEE indicates that the requirement status of a particular subsystem is red, the user should be able to see which components or performance indicators cause that subsystem's requirement status to be indicated as red. The modeling of a technical system from a systems engineering perspective is thus much broader in scope, deeper in model hierarchy, and longer in product life cycle when compared to business analytics, and workflow and dynamic system modeling and simulation.

Overall ISEE System Architecture

Figure 3:
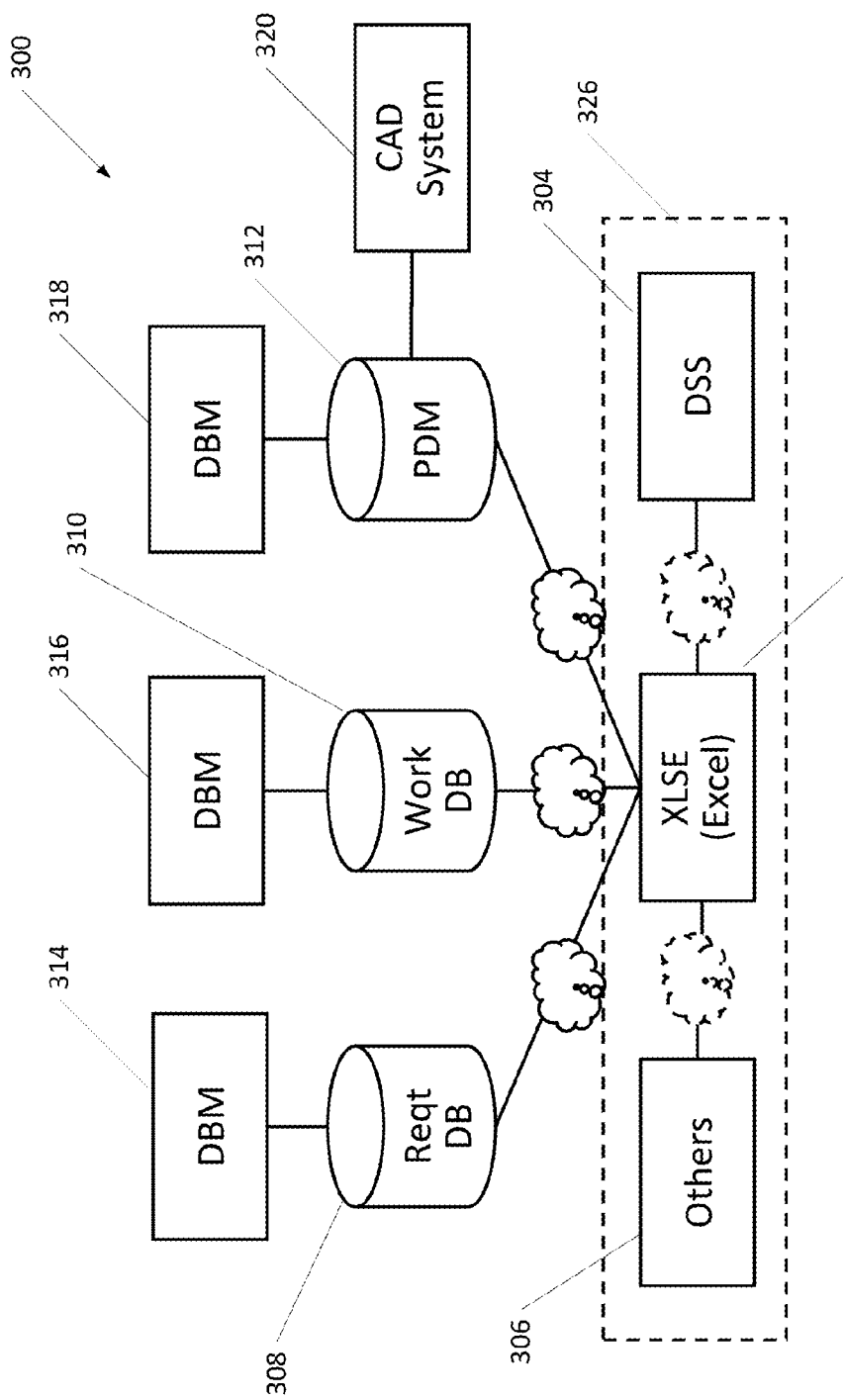
FIG. 3 is a block diagram illustrating an example architecture of an ISEE according to one embodiment.

An ISEE is often a federated system of applications. That is, unlike a dynamic system simulator or workflow simulator, which tends to be a monolithic piece of software, an ISEE typically has an application that serves as the access point for modeling, as a system, the product and the resources and processes required to develop the product. It also is the access point to view and update a product's development status, and where appropriate, to initiate development work such as performing a simulation or a test, and ordering hardware. The ISEE typically includes other applications and other components, such as databases, that are needed in working with a system model. FIG. 3 is a block diagram illustrating a high level view of an example architecture of an ISEE 300 according to one embodiment. The EXCEL® spreadsheet environment, enhanced with an XLSE add-in 302, allows the user to author the diagrams that depict the various aspects of a product using the OMG SysML modeling language. The ISEE 300 also includes a dynamic system simulator (DSS) 304 and may include other performance simulation tools 306. The ISEE 300, particularly the XLSE add-in 302, may access a number of databases, such as a requirements database 308, a work database 310 for managing work requests and status, and a products database (PDM) 312. These databases may be managed using respective database managers (DBMs) 314, 316, and 318. In addition, the PDM 312 may be configured to work with a CAD system 320. The XLSE add-in 302, the DSS 304, and the performance simulation tools 306 can be implemented as components of a process automation tool 326. According to various embodiments, the EXCEL® spreadsheet environment, enhanced with the XLSE add-in 302, is used to interact with various components of the federated system, such as the DSS 304; the performance simulation tools 306; the databases 308, 310, and 312; the database managers 314, 316, and 318; and/or the CAD system 320. Usage of the databases as components of an ISEE is described in more detail later in this disclosure.

In some embodiments, navigation aids built into the diagrams allow the user to view the model at different levels and from different perspectives. Moreover, macros linked to the diagrams can be used to perform tasks that are described in more detail later in this disclosure.

Modeling a System Using the XLSE Add-In

Figure 18:
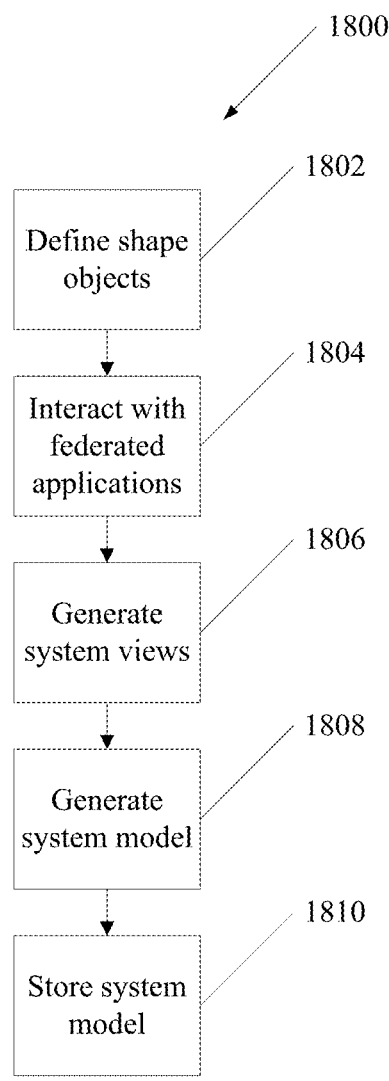
FIG. 18 is a flow diagram illustrating an example method for modeling a system.

FIG. 18 is a flow diagram illustrating at a high level a computer-implemented method 1800 for modeling a system. A computer is used to provide a spreadsheet environment. Shape objects are defined within the spreadsheet environment at a step 1802. The shape objects represent the components of the system. At least one component is a subsystem comprising a plurality of elements. The spreadsheet environment is used to interact with a plurality of applications for working with the system at a step 1804 and to generate a plurality of views of the system in a graphical system modeling language, such as OMG SysML, at a step 1806. The plurality of views include a requirements view, an activities view, a hierarchical view, a parametric view, and a component and subsystem interaction view as depicted in an internal block diagram and cross allocation table or view. A system model is generated at a step 1808 by using the spreadsheet environment to define relationships between the components of the system. At a step 1810, the system model is stored using a workbook in the spreadsheet environment.

Figure 3A:
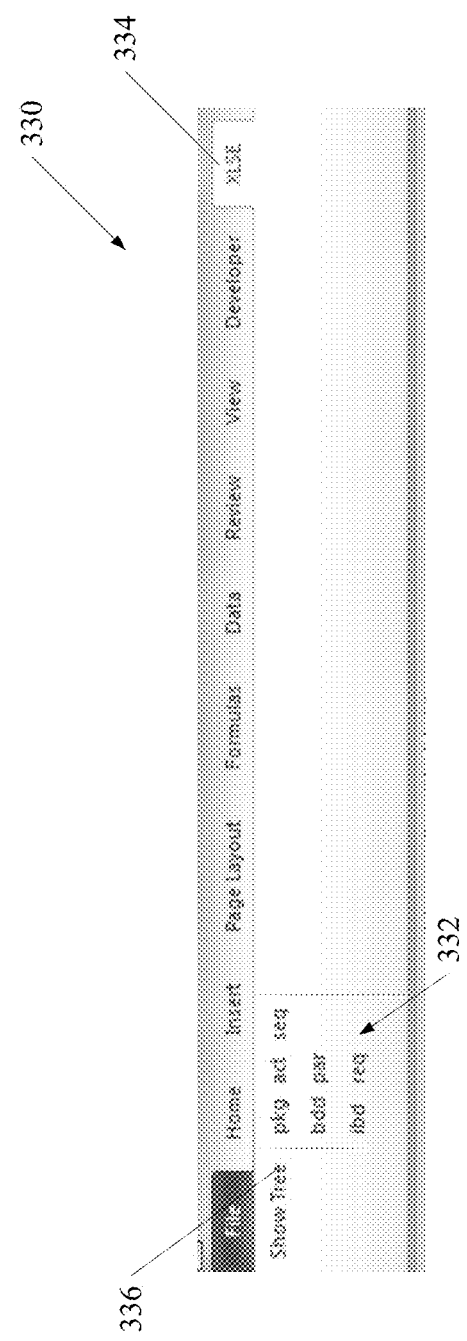
FIG. 3a is a diagram illustrating an example user interface for interacting with an ISEE.
Figure 3B:
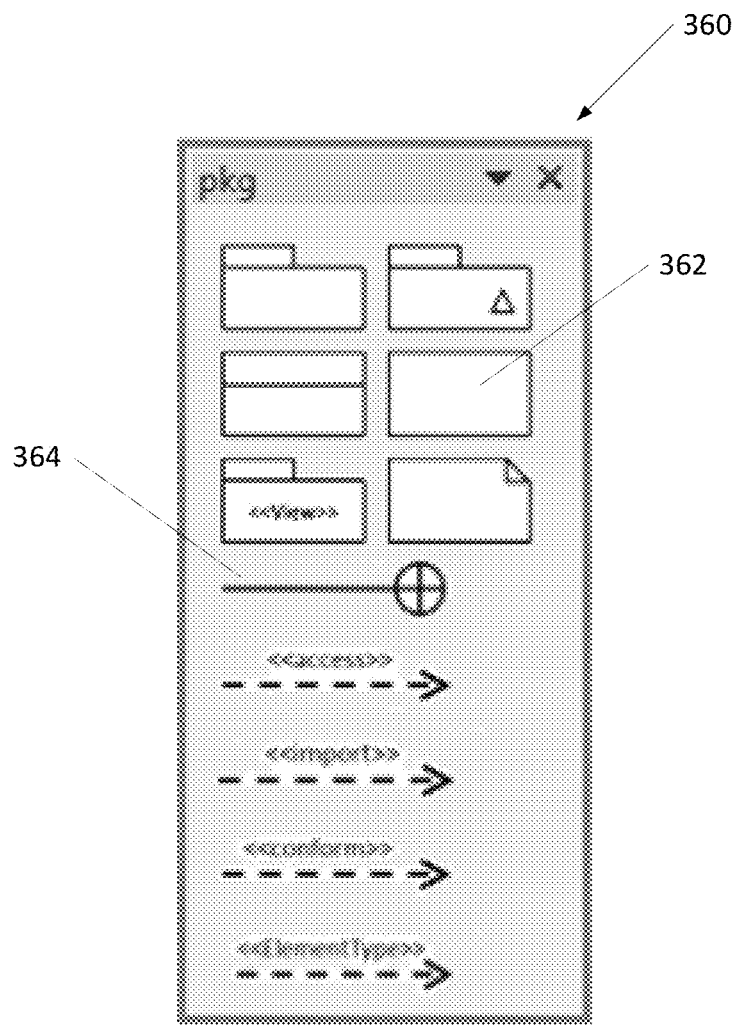
FIG. 3b is a diagram illustrating an example palette for constructing a package diagram.

Within the spreadsheet environment, a worksheet is used as a canvas for drawing OMG SysML diagrams. For drawing a diagram, the XLSE add-in augments native drawing functions in the spreadsheet environment by providing a set of command buttons, for example, in a Ribbon interface 330 of Microsoft's EXCEL® spreadsheet environment, as shown in FIG. 3a. In this interface 330, command buttons 332 within an XLSE tab 334 are mapped to OMG SysML diagram types. When one of the command buttons 332 is clicked, the XLSE add-in will display a palette of nodes and paths that are used in constructing the selected diagram type. In OMG SysML, the term node denotes a two dimensional object, such as a rectangle, and the term path denotes a line or an elbow. For example, FIG. 3b illustrates an example palette 360 for constructing a package diagram. The palette 360 includes a simple rectangular block 362 as well as a containment path 364, symbolized as a line with a circular crosshair at its end. In general, a menu will consist of OMG SysML modeling elements, namely, nodes, paths, tables, matrices, and trees. Dialogs may be presented to capture data such as block name and import aliases needed in drawing the model elements.

Figure 4:
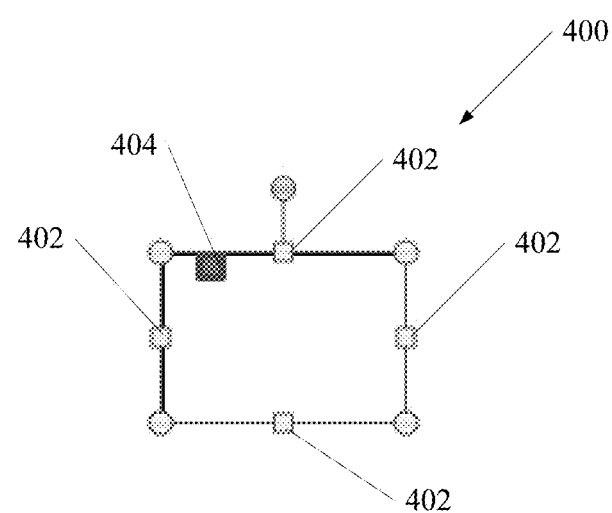
FIG. 4 is a diagram illustrating a shape in a spreadsheet environment having connection points.

To create a diagram, the user first selects various nodes from the aforementioned menus and palettes and connects them as needed with paths. For connecting a pair of nodes, the user first selects the pair and then clicks on the desired path. The XLSE add-in will connect the nodes with connectors that are native to the spreadsheet environment, such as lines and elbows. A dialog may be presented to capture additional data needed in drawing the path, e.g., import aliases. Alternatively, users can make the connections as one normally would with connectors, e.g., to fixed sites that are available in shapes in the spreadsheet environment, such as the four small rectangular midpoints 402 in the rectangle 400 shown in FIG. 4. In some versions of the spreadsheet environment, the midpoints 402 may appear, for example, as red dots when the end of a connector is brought to the vicinity of the shape 400.

Figure 5:
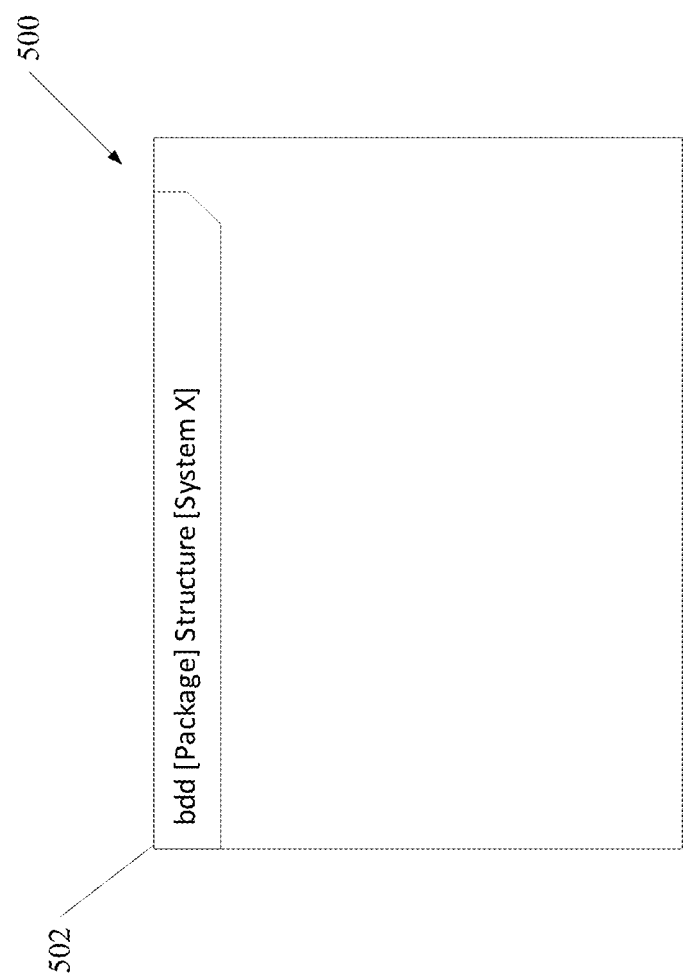
FIG. 5 is a diagram illustrating a diagram frame defined as a combination of other shapes in a spreadsheet environment.

However, in some cases the user may want to connect to a different location. Connecting to other locations can be facilitated by adding a small rectangle 404 that is then grouped with the node. The added rectangle 404 acts as a target for a path to connect to. It also provides a shape that can be pointed to by a connectorformat object in the EXCEL® spreadsheet environment. Since the native EXCEL® spreadsheet environment provides only a limited set of basic shapes, such as rectangles and ovals, many OMG SysML drawing elements need to be constructed as composites of basic shapes, i.e., by grouping and aligning basic shapes. For example, a diagram frame 500 shown in FIG. 5 can be constructed from two basic shapes that are aligned at an upper left corner 502. The rectangle 404 of FIG. 4 facilitates establishing this alignment. Another example is the containment path 364 of FIG. 3b, which can be drawn by joining a line with a crosshair.

Figure 6:
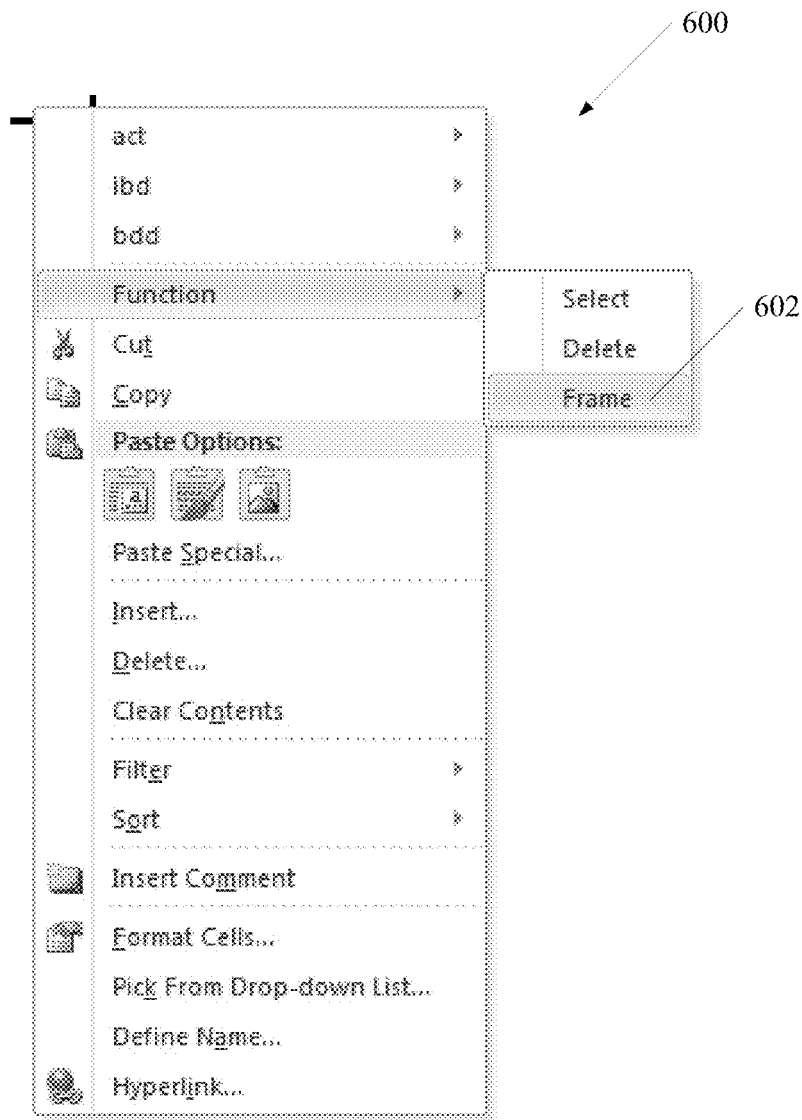
FIG. 6 is a diagram illustrating a context-sensitive menu.

Macros may be used to automate diagram creation tasks. For example, after drawing the nodes and connecting the nodes with paths, the user can select a frame command 602 from a context sensitive menu 600 of FIG. 6 to create a diagram frame of appropriate type and size to enclose the nodes and paths. Diagrams and model elements may be deleted and modified as shapes normally would be in the spreadsheet environment.

Text strings are an integral part of OMG SysML drawing elements. Keywords with a fixed format in the interior of a shape, such as the abbreviation bdd in FIG. 5, can be inserted programatically. Variable strings to be supplied by the user can be entered manually after the shapes are drawn, or inserted programatically. Inserting variable strings programatically may require using dialogs to capture the required data.

Figure 7:
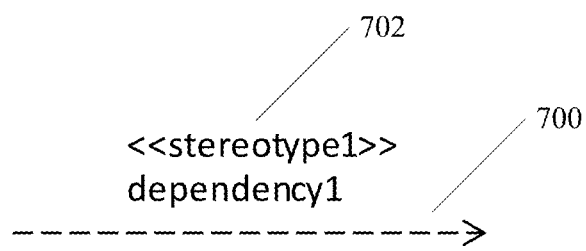
FIG. 7 is a diagram depicting a line with a text string attached to the line.

FIG. 7 depicts a line 700 with a text string 702 attached to the line 700. Text strings attached to a line, such as the text string 702, can be inserted programmatically into a textbox then grouped with the line 700. A command button or a dialog may be used to toggle text visibility, which is useful in controlling the appearance of a diagram.

Identifying the nodes that are connected to a path can facilitate using a diagram programmatically. This can be done by using the connectorformat object in conjunction with an endconnectedshape or beginconnectedshape. Alternatively, nodes that are connected to a path can be identified by comparing the x,y coordinates of a path's end point to the x,y location of the node's target location. For computational performance, it may be advantageous to save the connectivity information in a worksheet to reduce the need to recompute connectivity information.

Tables and matrices may be added to diagrams in the form of spreadsheet ranges. Shapes and other icons that are not part of the model, such as command buttons and illustrative pictures, can be added to a worksheet to provide functionalities.

Model Organization

Figure 8:
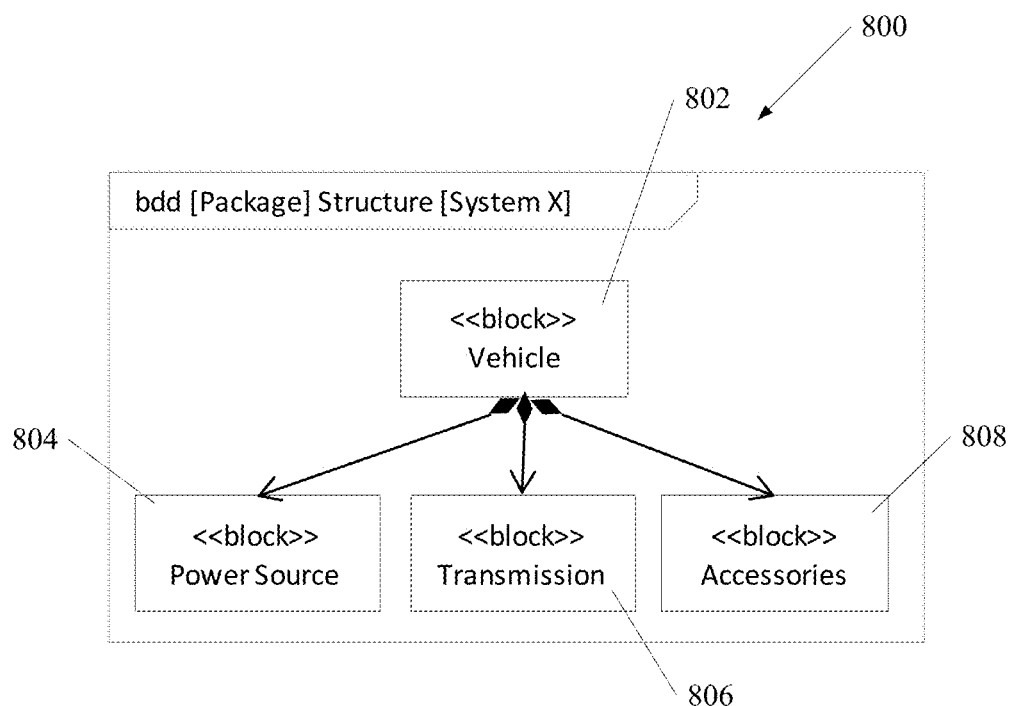
FIG. 8 is a diagram illustrating an example block definition diagram.
Figure 9:
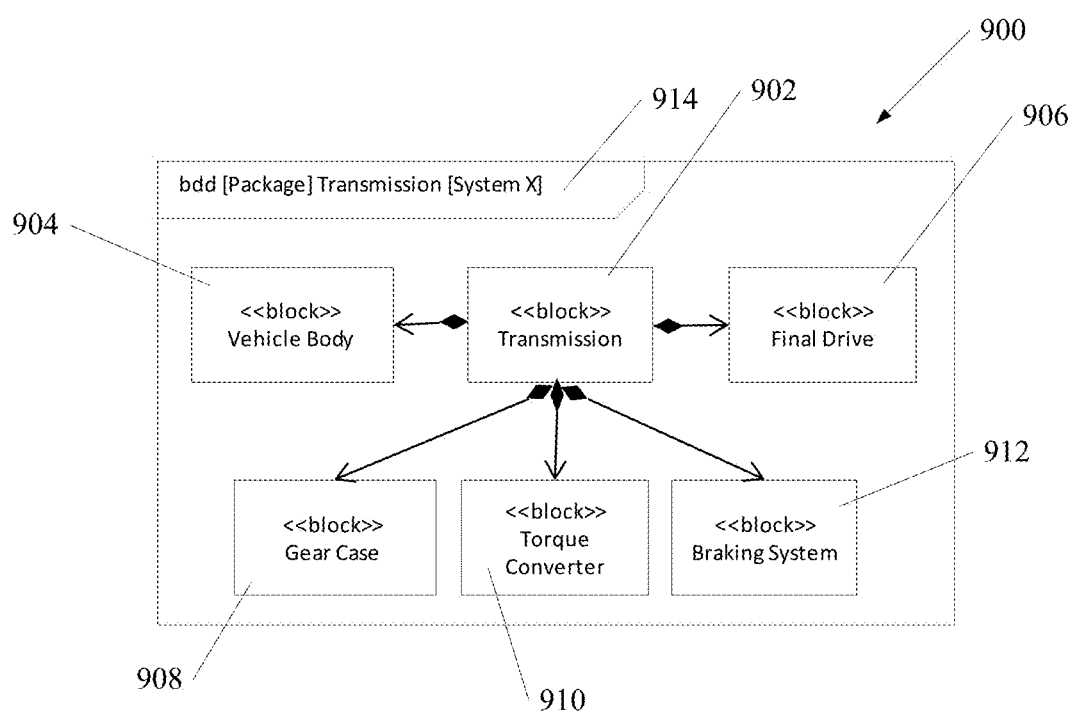
FIG. 9 is a diagram illustrating an example block definition diagram for one of the components of the block definition diagram of FIG. 8.

Model organization is important in providing a logical and efficient way to access and view the system from different perpetives. This is particularly true for complex products with many diagrams. Toward this end, the user may want to store the diagrams in various worksheets and workbooks. Hyperlinks strategically placed in nodes, paths, tables, and other model elements can then be used to traverse the model tree. For example, FIG. 8 illustrates an example block definition diagram (bdd) 800 for a vehicle. The bdd 800 includes a Vehicle block 802, a Power Source block 804, a Transmission block 806, and an Accessories block 808. Clicking on the hyperlink attached to the Transmission block 808 in FIG. 8 will activate a worksheet and bring another diagram representing the Transmission block 808 into view. FIG. 9 illustrates an example block definition diagram (bdd) 900 representing the Transmission block 808. The bdd 900 includes a Transmission block 902, a Vehicle Body block 904, a Final Drive block 906, a Gear Case block 908, a Torque Converter block 910, and a Braking System block 912. Hyperlinks attached to a Transmission block header 914 will close the workbook and return control to the higher level diagram, i.e., the bdd 800.

Figure 10:
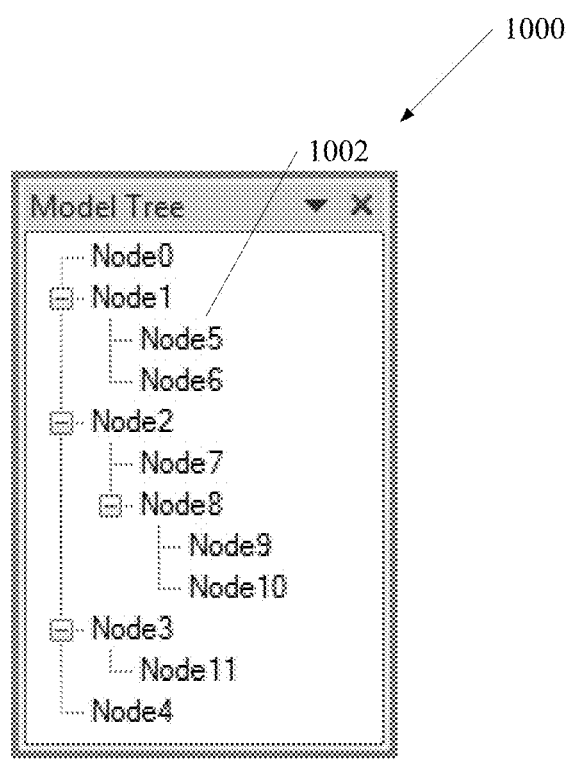
FIG. 10 is a diagram illustrating an example tree control.
Figure 10A:
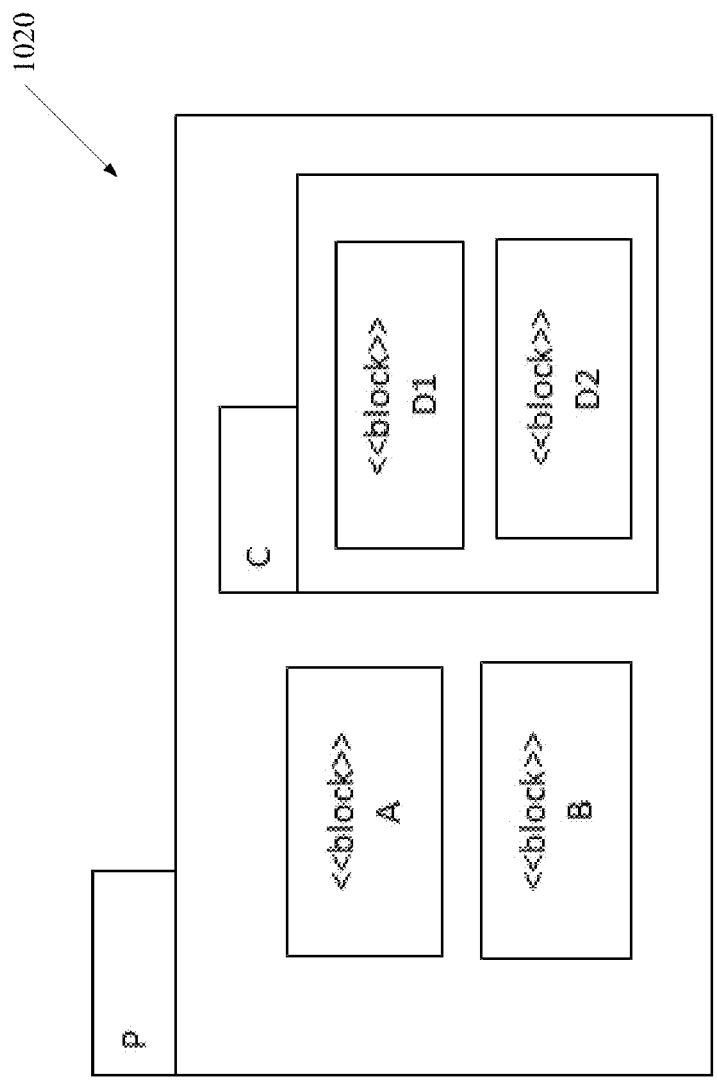
FIG. 10a is a diagram depicting an example package diagram.

Hyperlinks can be inserted manually or programmatically using information in the package diagram, block definition diagram, and internal block diagram. Alternatively, for navigating the model, a tree control, such as a tree control 1000 shown in FIG. 10, may be displayed to the user when a Show Tree command button 336 in FIG. 3a is clicked. Clicking on a leaf 1002 in FIG. 10 will activate the worksheet containing the corresponding diagram. To determine the hierarchy required in constructing a model tree, one may, for example, use the element location and position depicted in a package diagram. FIG. 10a illustrates an example package diagram 1020. From the example package diagram 1020, it can be deduced that blocks A, B, and C are children of block P, while blocks D1 and D2, as children of block C, are grandchildren of block P. OMG SysML provides other ways of describing the hierarchy, e.g., using the containment path in a package diagram, or whole-part composition relationship in a structural diagram. Appropriate techniques can be developed for those alternative means of depicting a hierarchy.

The physical organization of the workbooks is for the user to decide. For example, the user may want to group the diagrams by subsystems, e.g., powertrain in one workbook, and chassis in another. Diagrams in external workbooks may be imported using an OMG SysML import path. To facilitate access, file paths may be used as part of model element names.

Usage of OMG SysML Models

The various diagrams included in an OMG SysML models can be used to document a system, and as such, serve as a valuable communication tool. But the diagrams, particularly when drawn in a spreadsheet environment, may have other usages.

Figure 11:
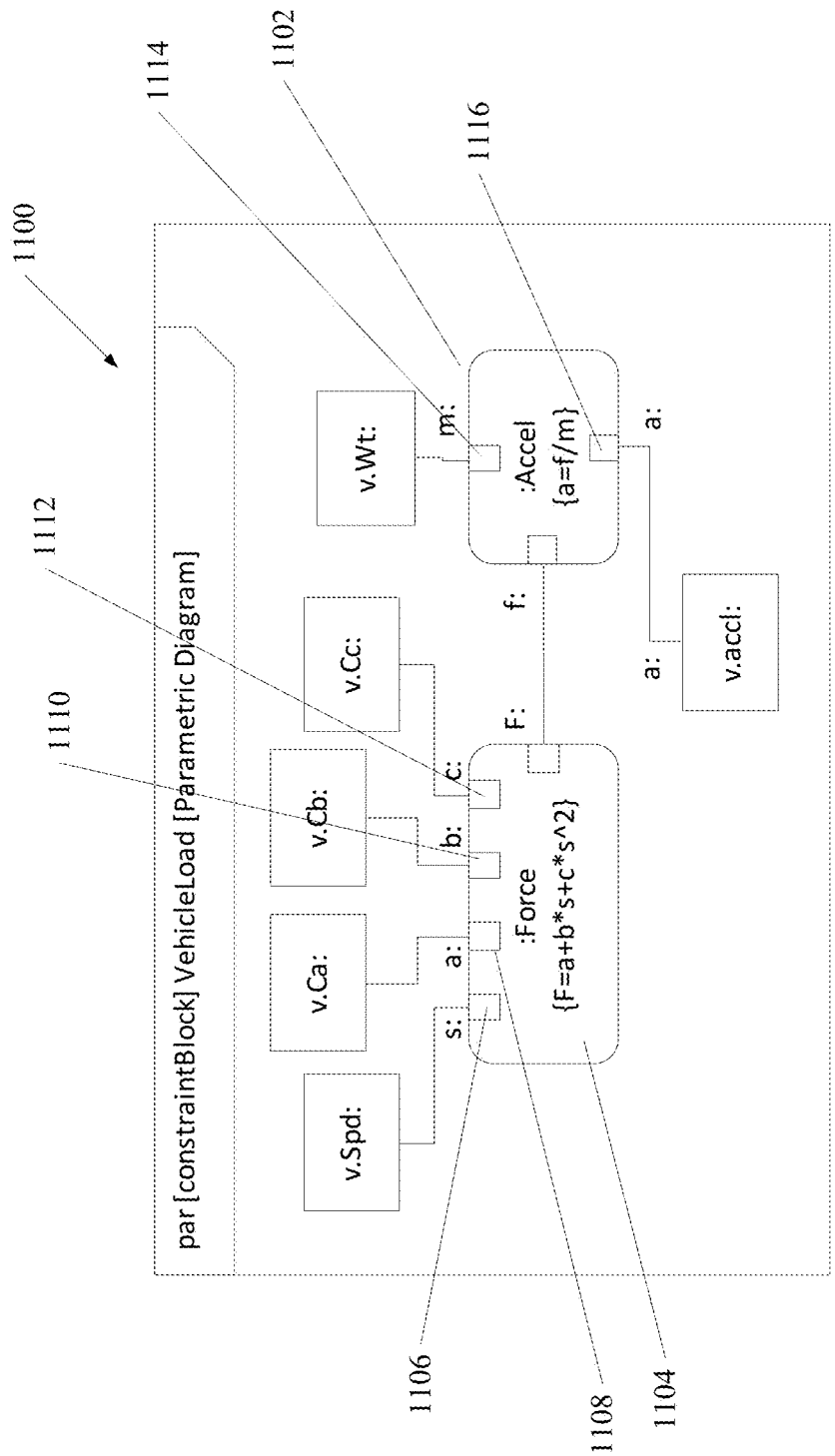
FIG. 11 is a diagram illustrating an example parametric diagram.

As an example, variables in a system may be related by relatively simple equations. For example, the load on a vehicle can be estimated from the vehicle speed s as $F=a+b*s+c*s^2$, where the coefficients a, b, and c are vehicle specific. The vehicle deceleration during coast-down on a flat terrain can in turn be calculated by Newton's law, $a=f/m$. In OMG SysML, the relationship among variables can be depicted with a parametric diagram. FIG. 11 depicts an example parametric diagram 1100. By mapping cells or ranges in a spreadsheet to the variables and setting the cell formulae to text extracted from textranges in rounded rectangles 1102 and 1104, the calculation capabilities of the spreadsheet environment can be used to update the vehicle acceleration whenever any of the variables at inputs 1106, 1108, 1110, 1112, 1114, and 1116 changes. Associated (linked) text strings in a block compartment and corresponding values in a requirement table can also be updated automatically.

In some embodiments, information needed for performance simulation of dynamic systems may include what components are in the system, information relating to signal and energy flow between components, initial conditions, loading, and component properties. The information can be found in several diagram types, including:

Block definition diagram (bdd), which shows the association of various system components, and may contain component properties in their value block compartments;

Internal block diagram (ibd), which shows how components are connected and what items (energy, fluid, current, etc.) flow between blocks;

Parametric diagram (par), which shows how variables are related, typically through equations;

Activity diagram (act), which shows how one or more input variables are transformed into output; and State machine diagram (stm), which shows how entities transition from one state to the next as triggered by events.

Each of these diagrams represents a corresponding model of the system. For instance, the state machine diagram represents a state machine model of the system.

To launch a dynamic system simulation, the user may create a simulation model from one or more aforementioned OMG SysML diagrams. The methods and algorithms for doing so depend on the dynamic systems simulator, otherwise called the solver. For example, for Modelica solvers, the XLSE add-in will recognize standard Modelica modeling components such as inertia, spring, resistor, etc. For Math Works' SIMULINK® software, the XLSE add-in needs to recognize similarly named components.

Figure 12:
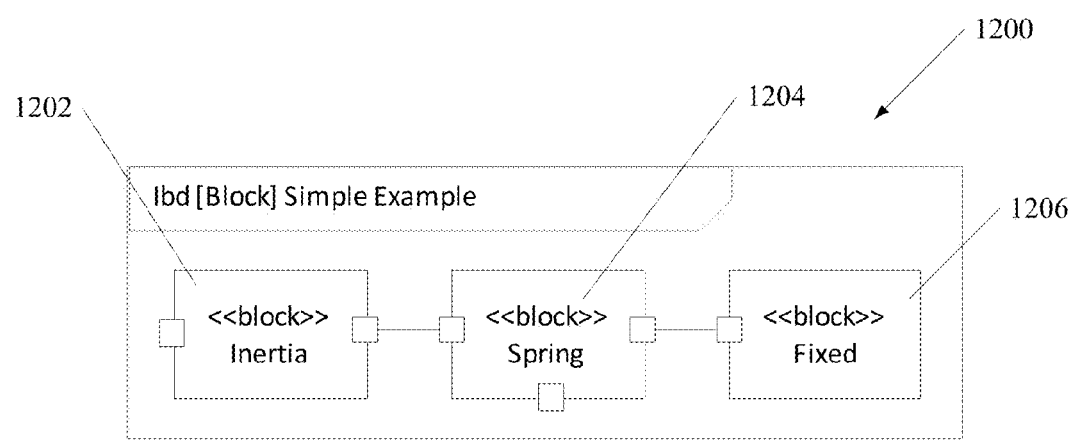
FIG. 12 illustrates an example internal block diagram (ibd) that is used to depict a simple system.

Regardless of the target solver, the creation of the simulation model involves determining the components' connectivity. Methods for determining connectivity are well known to those of ordinary skill in the art. FIG. 12 illustrates an example internal block diagram (ibd) 1200 that is used to depict a simple system. The ibd 1200 includes an Inertia block 1202, a Spring block 1204, and a Fixed block 1206. The XLSE add-in creates a simulation model file that states, in essence, that the inertia is connected to the spring, which is in turn connected to fixed (ground). In addition to the component connectivity, the simulation model also specifies the component properties. For the example, the required properties are the inertia, the spring rate, and the initial velocity and displacement of the inertia. Component properties can be found in a block's value compartments (not shown in the example) of an ibd or bdd.

Model elements such as inertia, spring, and fixed are not part of OMG SysML. Hence, the user needs to define them as user-defined classes that comform to the target solver requirements. For the Modelica solver, a workteam is defining a set of modeling classes, called the SysML4Modelica profile, which can be used by the systems engineering community. The methods and algorithms disclosed herein can be adapted to utilize the SysML4Modelica profile when it becomes available.

State machines are sometimes appropriate in modeling and simulating a dynamic system in which parts of the system may be in one of several possible states. An example is a vehicle transmission system, which may be in neutral, reverse, or one of several forward driving gears. OMG SysML provides a set of standard graphical and textual notations for describing how change of gears occurs. Parsing algorithms can be developed that recognize the blocks associated with the states, as well as actions that are executed upon, e.g., entry or exit of a block. The algorithms are similar to those used in parsing the diagram for process automation, as described below in connection with FIG. 16. Information gleaned from parsing can be used in a dynamic system simulator that supports state machine, including Modelica and MathWorks' STATEFLOW® software.

A command button can be placed in a diagram for launching a simulation. After the simulation is completed, the results can be saved to the same workbook where the simulation was launched. The charting capabilities of the spreadsheet environment can be used to visualize the results.

Figure 13:
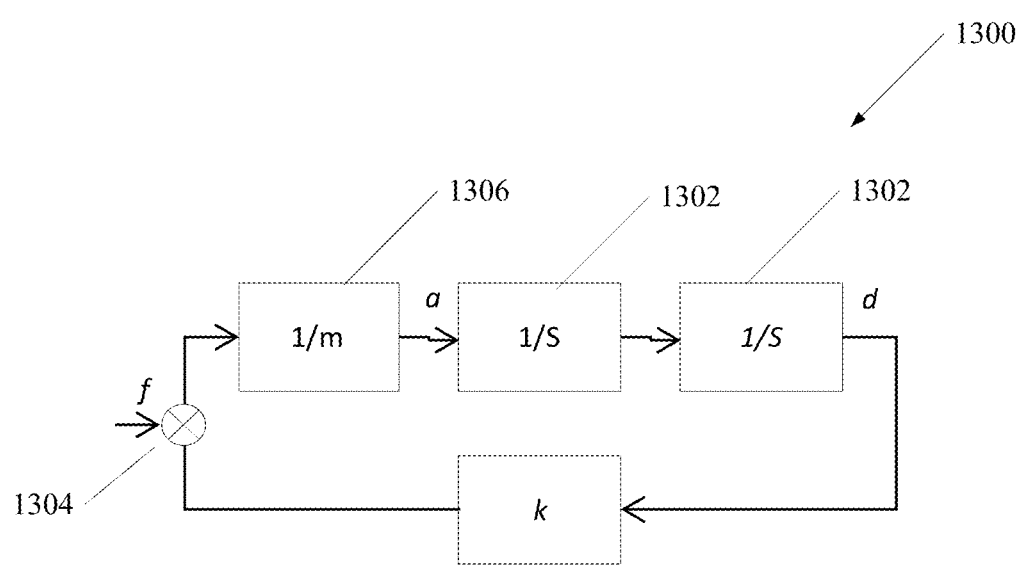
FIG. 13 depicts an example system diagram that models a simple system.
Figure 14:
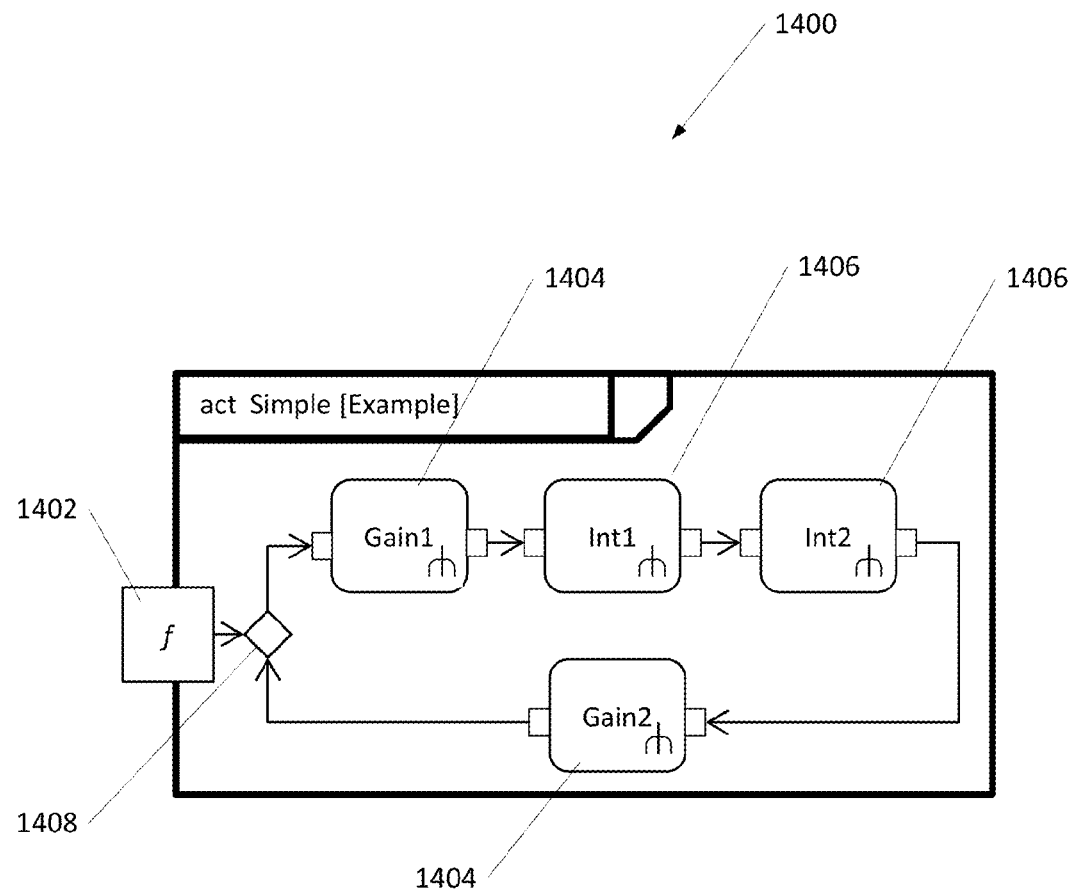
FIG. 14 depicts an example activity diagram that is equivalent to the system diagram of FIG. 13.

Key performance indices, such as fuel economy, can be written to a cells in a spreadsheet. The same numbers can be used to update the associated text strings in a block's value compartment, or a table in a linked requirement diagram. In some cases, a signal flow approach can be used to model a dynamic system. For example, FIG. 13 depicts an example system diagram 1300 that models a simple system. In the simple model depicted by the system diagram 1300, the spring displacement d is obtained by twice integrating the acceleration using integration blocks 1302. The acceleration is in turn obtained by using Newton's law, $a=(f+kd)/m$, where k is the spring rate, f is the externally applied force, and m is the inertia. A summation block 1304 adds f and kd, while a multiplier block 1306 multiplies the sum (f+kd) by 1/m. The OMG SysML activity diagram is suitable for modeling a dynamic system using the signal flow approach because it shows how input is transformed into output with actions and activity blocks. An equivalent activity diagram 1400 for the simple system is shown in FIG. 14. The appearances are remarkably similar. The activity diagram 1400 includes an input node 1402, gain nodes 1404, integrator nodes 1406, and a summation node 1408. Although the graphical notations in act and ibd diagrams are different, the algorithm for creating a simulation model from an act diagram is similar to that for ibd. Mainly, the algorithm deals with recognizing the nodes attached to a connector and interpreting the text strings and icons, such as the rakes in the lower right corner of the nodes, in the diagram.

Figure 15:
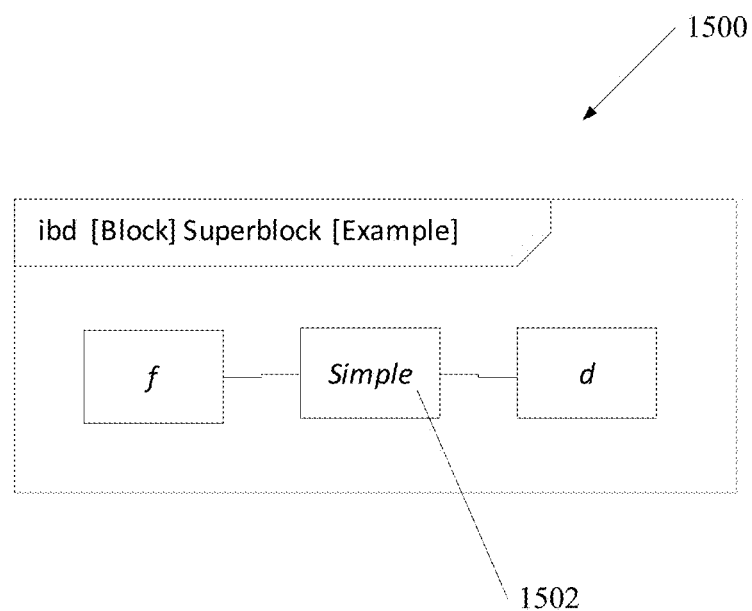
FIG. 15 depicts an example internal block diagram incorporating a superblock.

A block in an ibd or an act diagram may refer to a group of modeling elements, known as a superblock. FIG. 15 shows a simple spring-mass system 1500 as a superblock 1502 that is connected to an external force f and a block d to display the displacement. Connecting a superblock to other modeling elements can be done with the help of a dialog or with the dual-window method disclosed in U.S. patent application Ser. No. 12/967,360, filed Dec. 14, 2010, and U.S. patent application Ser. No. 12/972,042, filed Dec. 17, 2010. The disclosures of both applications are incorporated herein in their entirety.

In dynamic systems simulation, the solver may reside in the same computer as the spreadsheet environment, or in a remote location. The solver is indicated by the DSS block 304 of FIG. 3. The "cloud" with dashed line connecting the XLSE add-in 302 and the DSS block 304 indicates the solver may be a local client or in a remote server.

In addition, OMG SysML models can be used to launch other product evaluation and validation tools. For example, lumped parameter models are appropriate for characterizing the behavior of dynamics systems in which physical variables such as temperatures, velocity, voltage, etc., are idealized to be concentrated at certain points in space. Details such as shapes, elastic properties, and the like do not enter into the equations. For calculating stresses, magnetic field strengths, velocity distribution around bluff body, etc., high-order methods such as the finite-element or finite-volume methods may be used. Such methods require, among other data, detailed description of the geometry, and in most cases, a remote server to perform resource-intensive calculations. These requirements are beyond what a spreadsheet can provide; a spreadsheet cannot perform resource-intensive calculations and cannot easily be used to create 2D or 3D finite-element models. In those cases, the metadata for, and the results from launching a finite-element or finite-volume simulation can be stored in a block's compartment. Automation script that resides in a remote server can then be triggered by a macro in the spreadsheet environment to prepare the simulation data, launch the simulation, monitor the run, and fetch and report back the results when the run completes. Simulation results include key indices that can be used to update table entries in a linked requirement diagram. Simulation results also include details that are too large to store in a spreadsheet. Those results can be stored in a remote server and be accessed as needed with file path stored in the spreadsheet. Launching other performance simulation tools is indicated in FIG. 3 as the box 306 marked "Others." The tools can include, but are not limited to, finite-element and finite-volume meshers and solvers as cited earlier, as well as computer aided design (CAD) software used for drawing and detailing parts, electrical and electronic system design software, knowledge based engineering tools that are often integrated with CAD software, multibody dynamics solvers and antiquated Disk Operating System (DOS) applications that work with command line input and text files.

Figure 16:
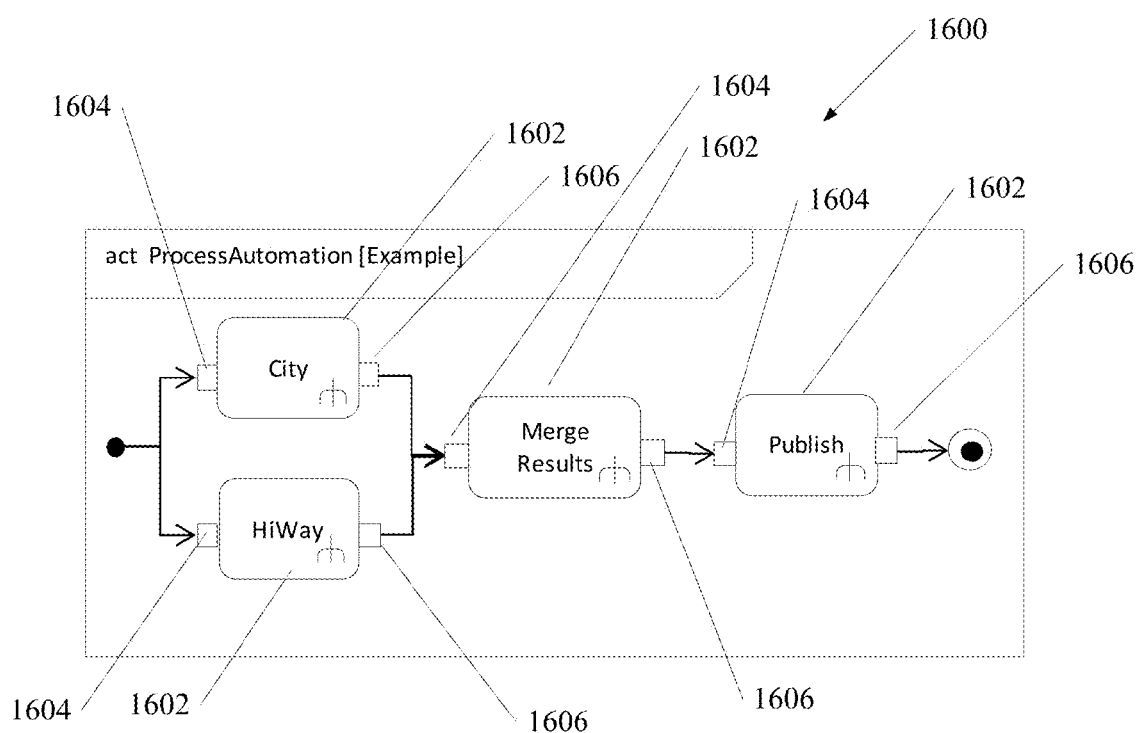
FIG. 16 depicts an example activity diagram used for process automation.

OMG SysML activity diagrams can be used for purposes other than modeling dynamic systems. For example, a number of related models can be run to produce an analysis report from data stored in external files or workbooks. FIG. 16 shows an example activity diagram 1600 that can be used for process automation. Implementing process automation in the EXCEL® spreadsheet environment consists of launching macros linked to the actions depicted in the diagram when conditions are met. The concepts of tokens and pins in OMG SysML may be used to control the order of launching the macros.

In the activity diagram 1600, actions are represented by rectangles 1602 with rounded corners. Tokens are items, such as information or variables, that are passed between actions through pins 1604 and 1606, which are the small rectangles attached to the outside of an action rectangle. Some pins 1604 are for input, while other pins 1606 are for output. A string may be appended to the name assigned by the spreadsheet environment to each pin to represent its state. For example, a "no" indicator, such as 0, signals that the token associated with the pin is not available or has not been received. A "yes" indicator, such as 1, signals the opposite.

Process automation can be implemented as a do loop where the action blocks in an activity diagram are continuously checked for their readiness to launch. For a given action rectangle, the state of all its pins is initially 0. When the macro associated with an action rectangle 1602 completes execution successfully, its output pins 1606 are set to 1, i.e., the pin names are updated. Likewise, the input pins 1604 of the downstream action rectangles 1602 receiving the token are also set to 1, indicating tokens have been received. The downstream action rectangle 1602 will launch its macro when all of its input pins 1604 have a state of 1. The do loop is terminated when the last of the downstream action rectangles 1602 completes execution.

OMG SysML also allows for control tokens to be passed between actions, and provides control nodes such as fork and join for routing the token flow. Those tokens and nodes can be handled using logical (if-then-else) constructs within the do loop.

An action in an activity diagram may require a human actor, e.g., to perform a test or run a finite-element simulation in the absence of automation scripts. In those cases, a work request system may be used as an intermediary to accept work order from the XLSE add-in when the user clicks a command button, and to dispatch the order for execution by the appropriate work team. Such a work request system can be as simple as a set of scripts written in an e-mail system, for example, the OUTLOOK® e-mail client available from Microsoft Corporation. Results can be reported back as attachments when the work is done. Scripts in the OUTLOOK® e-mail client have the advantage that they can programmatically update the cells, shapes, and other objects in a workbook in the EXCEL® spreadsheet environment. Process automation is indicated in FIG. 3 as the large rectangle with dashed line at reference numeral 326.

Figure 17:
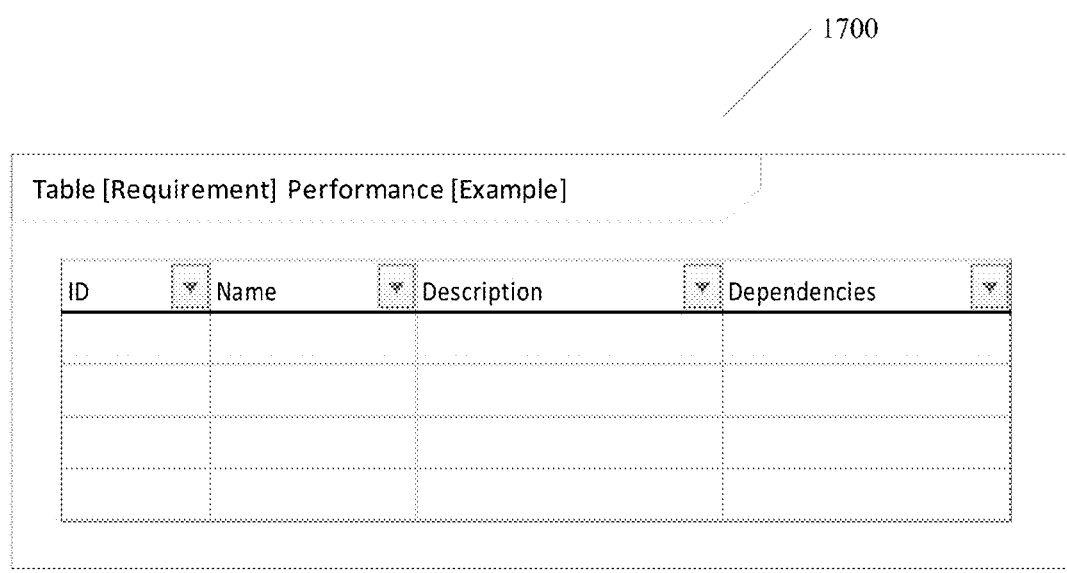
FIG. 17 is a diagram illustrating an example table for specifying systems requirements.

In some embodiments, systems requirements can be specified in OMG SysML in a graphical or tabular format. In a spreadsheet environment, the tabular format can be implemented by first inserting a table 1700 in a worksheet, and then inserting a diagram frame over the table, as shown in FIG. 17. Users will be able to leverage the capability of the EXCEL® spreadsheet environment to manipulate tabular data, such as pivot table, filter, row and column grouping, and in certain versions of the EXCEL® spreadsheet environment, slicers and sparklines. Moreover, cell values can be updated programatically as a result of doing a performance evaluation either as an isolated event, or as part of conducting a process automation.

OMG SysML provides various ways, called cross-cutting constructs, to show dependency between system components. For example, a dashed arrow with an appropriate keyword such as <<satisfy>> or <<copy>> can be used to indicate a relationship between two components. Alternatively, a keyword and name of component, such as satisfiedBy <<block>>xyz, may be in a block compartment to indicate the dependency. To programmatically update a requirement table, a macro can be written that parses the aforementioned cross-cutting constructs in a requirement diagram for test cases and related activities which in turn are mapped to launchable performance evaluation processes. The macro will also parse for cell locations and text ranges that need to be updated. Alternatively, where only a tabular format is used to depict the requirements, the macro can extract the required information from appropriate columns in the table.

During project review, it is often desirable to have a high-level, compact view of the development status, i.e. whether a system and its subsystems are red, yellow, or green. Moreover, for a subsystem that has development issues, it is often desirable to be able to drill down for root causes and relevant technical information. For example, one may want to know the maximum stresses in a part that has been identified as the "culprit." To enable requirement roll-up, where several performance indicators are compared to their target values and the deviations are combined to give an overall rating of red, yellow, or green, a macro can be written that uses the containment information in a requirement package diagram in combination with the constraint equations in a parametric diagram. The drill down also uses the same containment information, but uses the constraint equations in an inverse way.

As disclosed above, the XLSE add-in can be used to initiate and manage work using, e.g., a simple email system and to subsequently update the requirements table. In many cases, the user community may want to store the results in a database to provide, for example, better access control and scability. To support that requirement, the XLSE add-in may use an intermediary work management application that not only initiates and tracks work orders and reports back results, but also optimizes work schedules and resources. Since such an application typically uses a database to persist data, the XLSE add-in may programmatically pull information from the database to update activity status in a process automation loop and table entries in a requirement diagram. The update may be triggered by events, such as receipt of a work completion notification. The external databases that XLSE works with are collectively called work databases, shown as the work database 310 of FIG. 3. Database managers (DBMs) 314, 316, and 318 are used to manage and provide alternative views into the databases.

In addition to the work databases, the XLSE add-in may have to work with a product database 312, which is often tightly integrated with a CAD system 320 used for detailed design and parts release, as shown in FIG. 3. The XLSE add-in may also have to work with a variety of other databases (not shown in FIG. 3) that contain material properties, historical usage data, customer preferences, etc. The principle of using an intermediary application to initiate and manage work remains the same, but the information passed to the XLSE add-in is different. For example, subjective ratings and results from lumped parameter models may be used in a neural network model to optimize vehicle content and configuration.

The requirements database 308 of FIG. 3 may be used to manage requirements. Information may be pulled from those systems in a similar fashion as with the product database 312. In this regard, a database may be used to merge the external requirements with those contained in the XLSE add-in. Access to all databases may be made through ODBC connectivity of the spreadsheet environment. In this way, the database can be used as a model repository and can be synchronized with a workbook in the spreadsheet environment. More description of integration with a database in the EXCEL® spreadsheet environment is given later in this disclosure.

Some spreadsheet environments can take advantage of productivity suite interoperability, which provides a consistent set of object models to all applications in the productivity suite, to enable programmatic creation of other documents in the productivity suite from the shapes and other objects contained in a workbook. For example, comment blocks in various diagrams can be scanned and their contents extracted to populate an analysis report. As another example, one may prefer to view the state of requirements of a particular subsystem in a presentation format. The information may be compiled programmatically by copying the relevant diagrams and annotation to a Microsoft POWERPOINT® presentation software file or a Portable Document Format (PDF) file and subsequently displaying the file in a Web browser. In addition, developers can take advantage of Office/SharePoint integration in Microsoft's OFFICE® productivity suite to provide functionalities such as check-in/check-out and version control that are advantageous in a collaboration environment.

Use of Templates in ISEE

A product may be viewed from different perspectives. A functional view describes a product in terms of what it has to do. To aid the design process a view is often decomposed into layers of sub-views. For example, an automobile has to deliver, among other functions, a transportation function, which may be decomposed into propulsion, steering, and braking functions. Propulsion in turn may be decomposed into power generation, power conversion, fuel economy, range, and other attributes that characterize how power is generated and used. Another view of a product is a description in terms of its parts or attributes. An automobile, in the physical view, has among other parts, an enclosure and a powertrain. The powertrain, in turn, can be decomposed into a power source, a power transmission device, and the vehicle body. For a conventional engine, the power source can be further decomposed into an engine block, a piston assembly, a connecting rod, a timing chain, etc.

The functional and physical views are universal in that every product provides at least one function, and those functions can only be performed through some forms of physical embodiment. The term product also applies to software, where classes, procedures, forms, etc. are parts of the physical view, and the functions they perform are included in the functional view. In some embodiments, templates can be used to encapsulate the essential contents in each of the two views, the details of which depend on the domain of application. The templates can then be instantiated based on specific usage. For example, templates for an automotive vehicle is different from say, a soap dispenser or a home security system. For an automotive vehicle, the template will include, in addition to the transportation function already mentioned, such top level functions as provide security, provide infotainment, minimize noise and vibration, etc., and such top level physical partitionings as body interior, body exterior, chassis, closures, etc. When a project team use the template on say, a small car, the template will be instantiated with a small engine, a correspondingly small transmission, set of tires and wheels, cooling and heating systems, and so forth. In some embodiments, templates can be synchronized with at least one database that contains subsystems and components that can be used to instantiate a template. Filters can be provided to narrow down the choices, from which the user can make the final selection.

Figure 19:
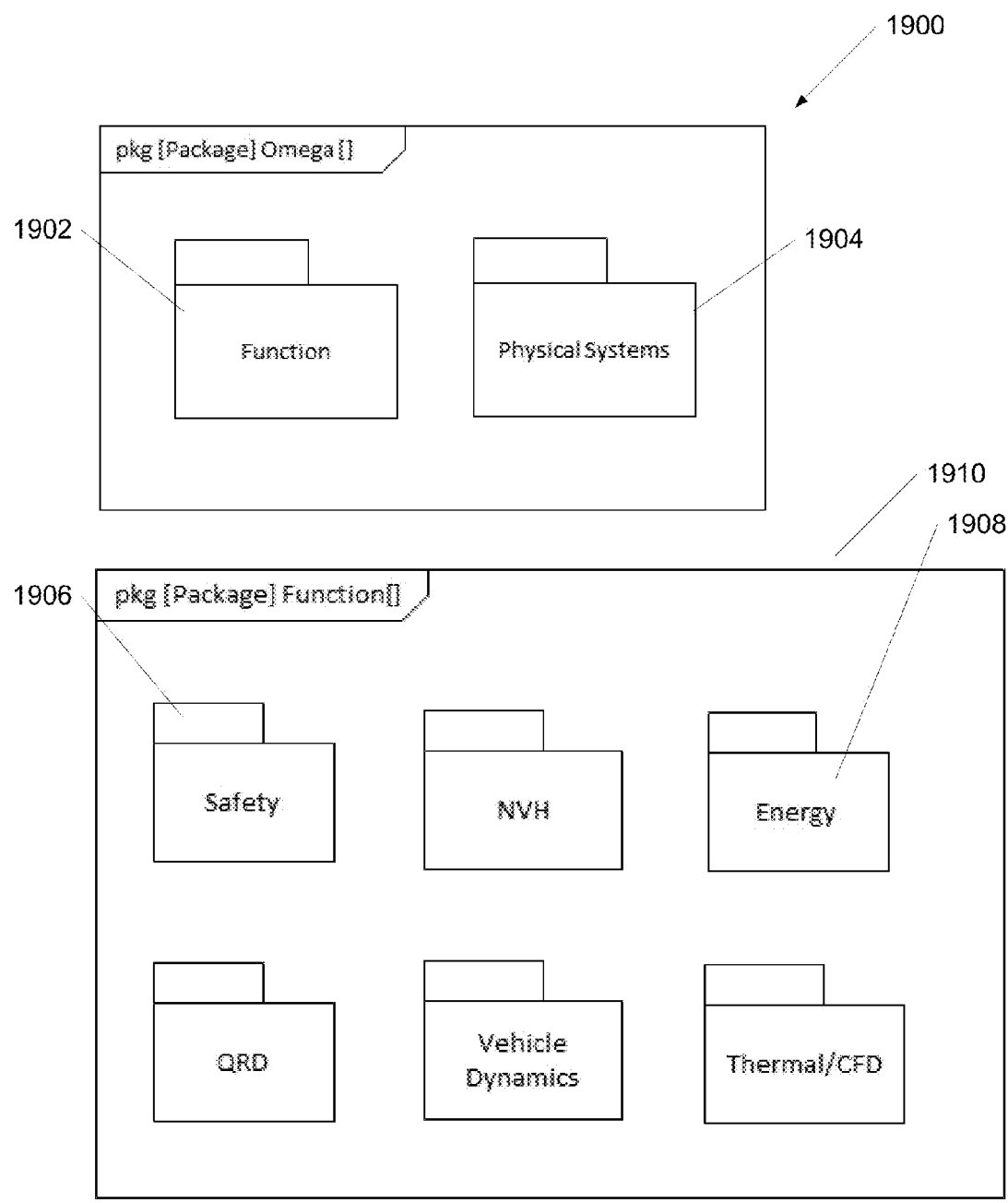
FIG. 19 is a diagram illustrating decomposition of an automotive vehicle into a functional view and a physical view by using a SysML package diagram.
Figure 20:
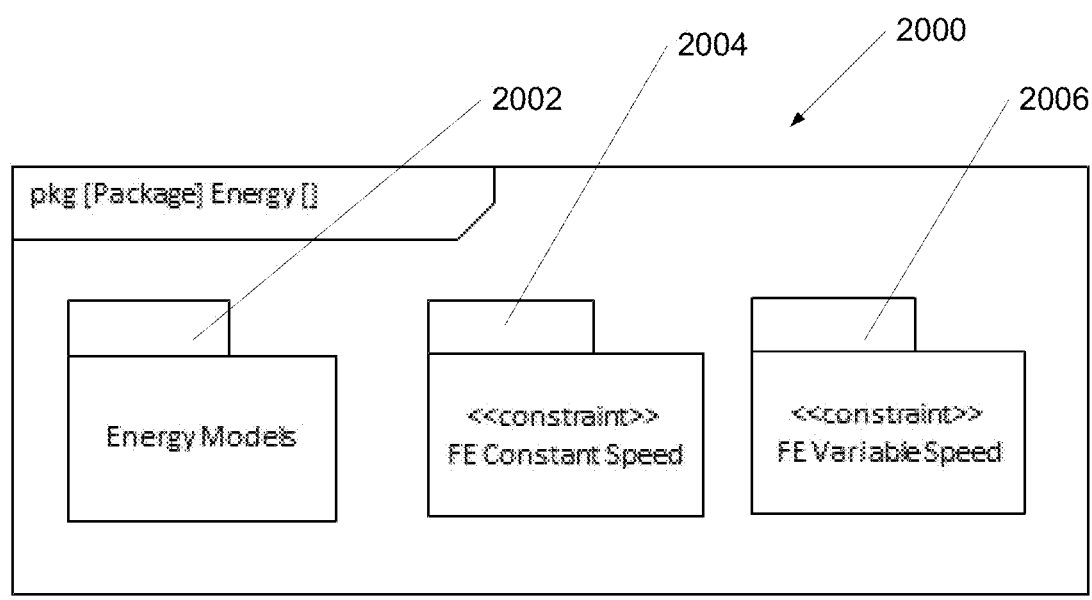
FIG. 20 is a diagram illustrating decomposition of an energy function of an automotive vehicle using a package diagram.

Template workbooks can be created with information included in SysML diagrams. Such information is often based on best practices of a specific industry. As an example, FIG. 19 shows the decomposition of an automotive vehicle into a functional view 1900 and a physical view 1902 by using a SysML package diagram 1904, and the further decomposition of the vehicle functions into a safety function 1906, an energy function 1908, etc. again by using a package diagram 1910. Each of the functions can be further decomposed by using a package diagram, or other SysML diagrams that define a parent-child relationship. FIG. 20 shows a package diagram 2000 that decomposes the Energy function 1908 of FIG. 19 into an Energy Models package 2002, which includes methods associated with fuel economy estimation, and two constraint packages 2004 and 2006, each containing expressions that relate fuel economy metrics to vehicle parameters. The Energy Models 2002 and constraint packages 2004 and 2006 are not per se children of the Energy function, but are rather calculation methods associated with an energy sub-function, namely, the fuel economy. Calculation methods associated with other energy sub-functions, e.g. driving range and longitudinal acceleration, can also be included. Similarly, the physical view can be decomposed into multiple layers of sub-views.

Figure 21:
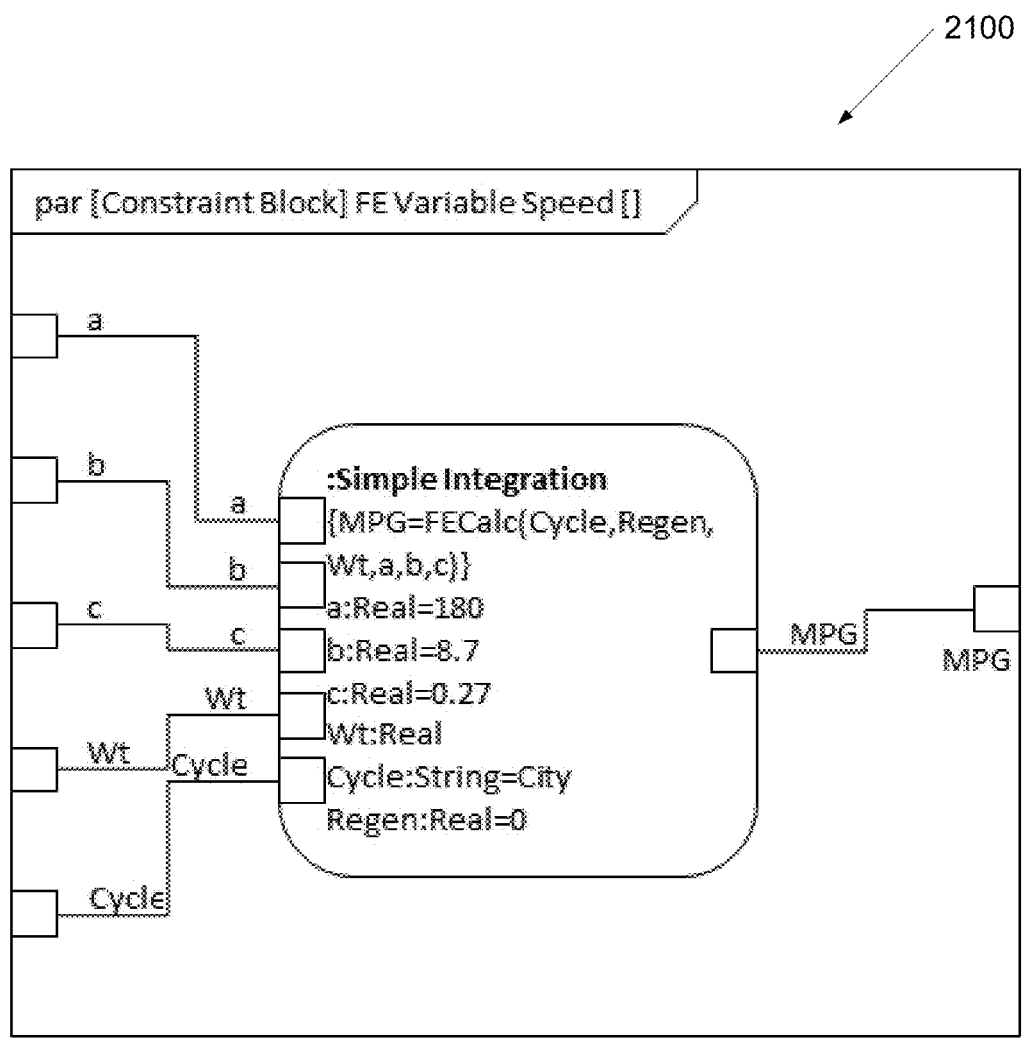
FIG. 21 is a diagram illustrating an example SysML constraint block.

For monitoring performance and tracking conformance to requirements, templates need to include performance metrics, also called Measures of Effectiveness (MoE's), and design parameters whose values affect the MoE's. Thus, the decomposition in both functional and physical views needs to ultimately reach the MoE's and design parameters that typically found at the component level. Emphasis is added because a component can be as small as a bolt, or as large as an entire instrument panel—a component is simply an entity that for the purpose of modeling, cannot be, or does not have to be, further decomposed. FIG. 21 shows an example SysML constraint block 2100, where decomposition has reached the component level. In this case, for the purpose of estimating the fuel economy (MPG), it is sufficient to know the drive cycle (City or Highway), the vehicle mass (Wt), the load coefficients (a,b,c) and the degree to which the braking energy is recovered (regen).

Figure 22:
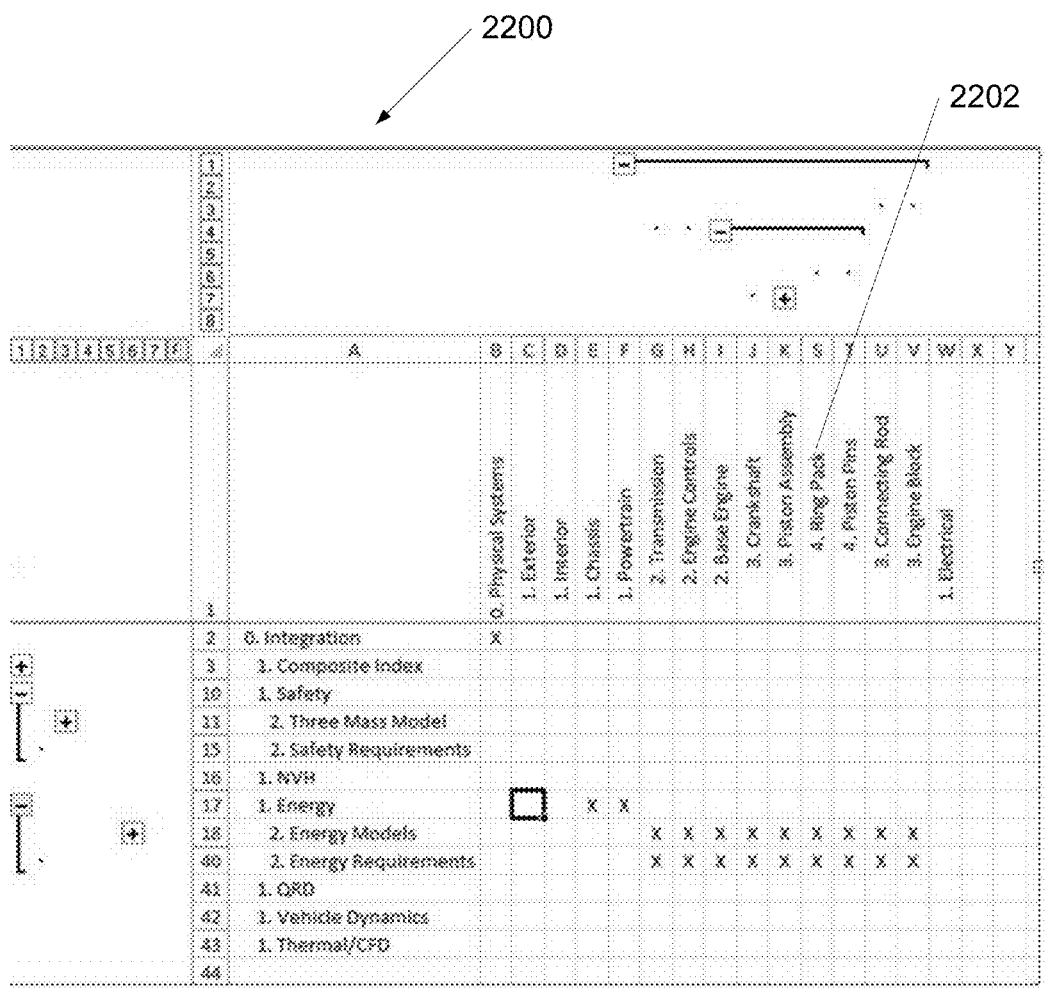
FIG. 22 is a diagram illustrating a matrix representative of an example mapping that indicates relationships between components or functions of a system.

In systems engineering, a mapping of the functional and physical views is often used to visualize and help understand the effects of change. For example, engineers responsible for the vehicle energy management should be consulted when design changes are being contemplated for an engine. The function-to-physical mapping often takes the form of a matrix, with functions as rows and physical parts or attributes as columns. The rows and columns may, of course, be transposed without changing the mapped relationships. A worksheet offers a natural and convenient vehicle for displaying such a matrix. FIG. 22 shows an example mapping 2200, where an "X" denotes the presence of a relationship between components or functions corresponding to the row and column that intersect at a cell containing the "X," and an empty cell denotes the absence of a relationship. It will be appreciated that other symbols may be used to indicate the presence or absence of a relationship. In addition, a number or other markers may be used in lieu of "X" to denote the degree or strength of relationship. When displayed in a worksheet the rows and columns corresponding to the sub-views may be expanded or collapsed by clicking on the buttons with the plus/minus signs.

According to some embodiments, the contents of the function-to-physical mapping matrix can be created programmatically to reflect the current system contents. The algorithm is similar to that used in creating the model tree disclosed above in connection with FIG. 10, consisting primarily of (1) recognizing the parent-child relationship, (2) classifying a node in the model tree as either physical or functional through inheritance, and (3) placing all functional nodes in column A and physical nodes in row 1. Again, the mapping matrix may be transposed by placing functional nodes in row 1 and physical nodes in column A. Appropriate indentation may be included to improve readability, and hierarchical groupings may be added by calling API functions provided by the spreadsheet environment.

Figure 28:
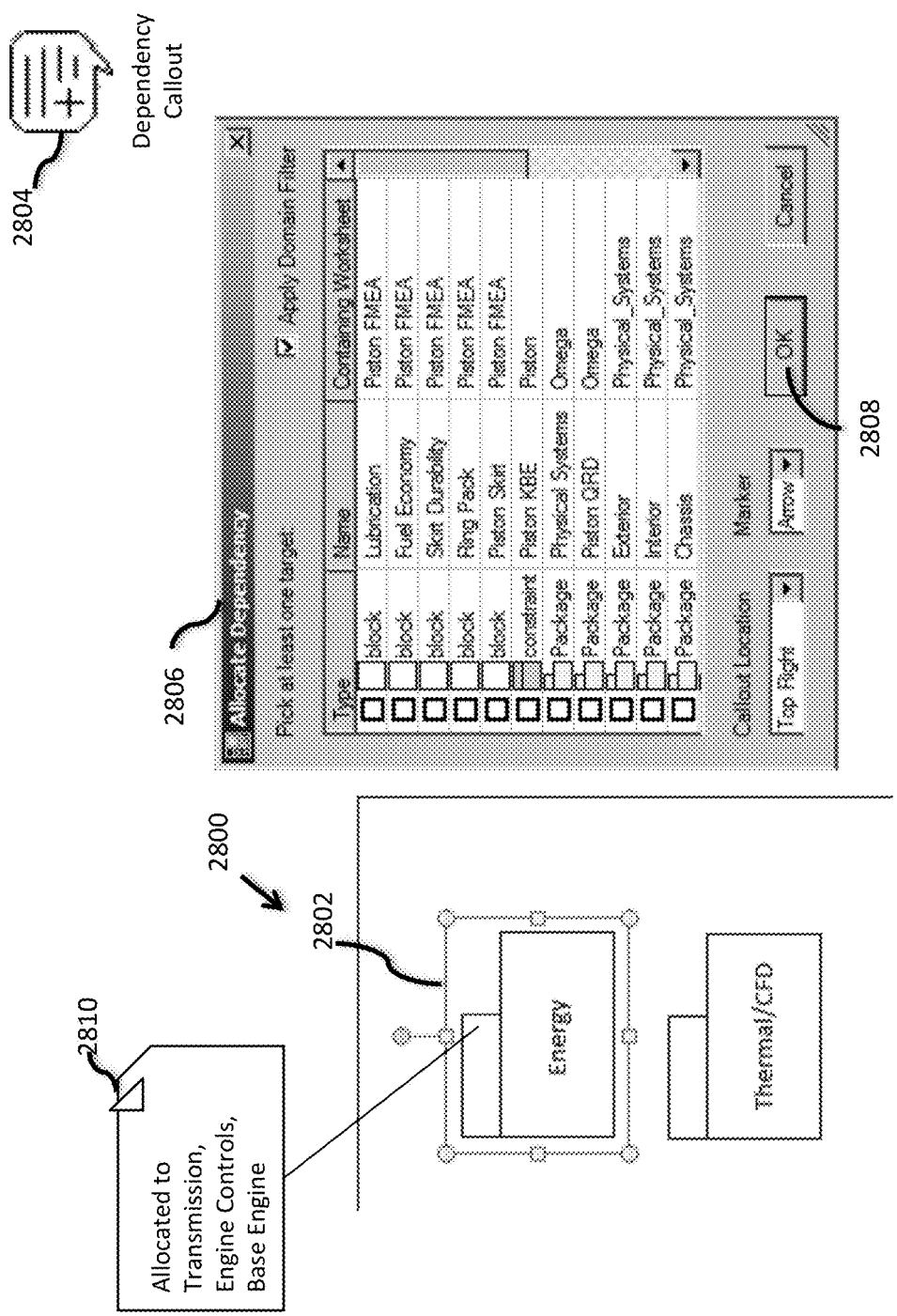
FIG. 28 illustrates an OMG SysML diagram in which a user can specify a dependency relationship.

According to some embodiments, markers used to denote presence of relationships may be generated based on information depicted in OMG SysML diagrams. For example, FIG. 28 depicts an OMG SysML diagram 2800 in which a user can specify a dependency relationship. The user may highlight a node 2802, labeled "Energy," in a OMG SysML diagram and click on a command button 2804, labeled "Dependency Callout," to display a dialog 2806 from which the user may select system components which "Energy" is dependent upon. When the user clicks an OK button 2808 in the dialog 2806 a callout 2810 is created programmatically and attached to the engine node 2802. The callout 2810, which includes the selected components, for example, Transmission, Engine Controls, and Base Engine, can then be processed to generate the dependency markers. Toggles can be added to hide or display the callouts.

A template may be edited by a project team depending on specific needs. In the example shown in FIG. 21, the team may decide to change the values of load coefficients based on test results, or modify the way fuel economy is estimated that is embodied in the macro FECalc (note that a template file can include one or more macros). In some cases the team may want to remove an entire segment of the system model, say, a Ring Pack 2202 in FIG. 22, either because they are not used, or they are not considered a design issue.

Instantiated templates may be copied and edited by a project team. For example, for a vehicle program where only a few changes are to be made to an existing design, the SysML workbook associated with the original design can be easily duplicated and edited to reflect the contents and features of the variant vehicle.

Tools used for evaluation of an MoE may be included in a template workbook. They can be implemented in the form of simple cell equations, or more generally, in the form of macros. Macros can be used to perform a variety of calculations. Data needed in the evaluation of MoE can be embedded as worksheets in the template workbook, read in as external files, or downloaded from a database.

Templates may also include business process models. The example disclosed above in connection with FIG. 16 shows how SysML activity diagrams may be used to automate process steps indicated in such diagrams. A wide variety of business processes exists, including, but not limited to, change management, workflow, and product release. Data associated with each process can be obtained from, and if needed, synchronized with, at least one external source to instantiate a template in a similar manner as product templates.

According to some embodiments, systems engineering tools commonly used to enhance product or process quality may also be provided to the users in template forms. These tools include, but are not limited to, Failure Mode and Effects Analysis (FMEA), Failure Mode, Effects and Criticality Analysis (FMECA), Fault Tree Analysis (FTA), and Critical To Quality (CTQ) analysis. The following paragraphs describe what each tool does, and how they can be implemented in a spreadsheet environment.

Figure 23:
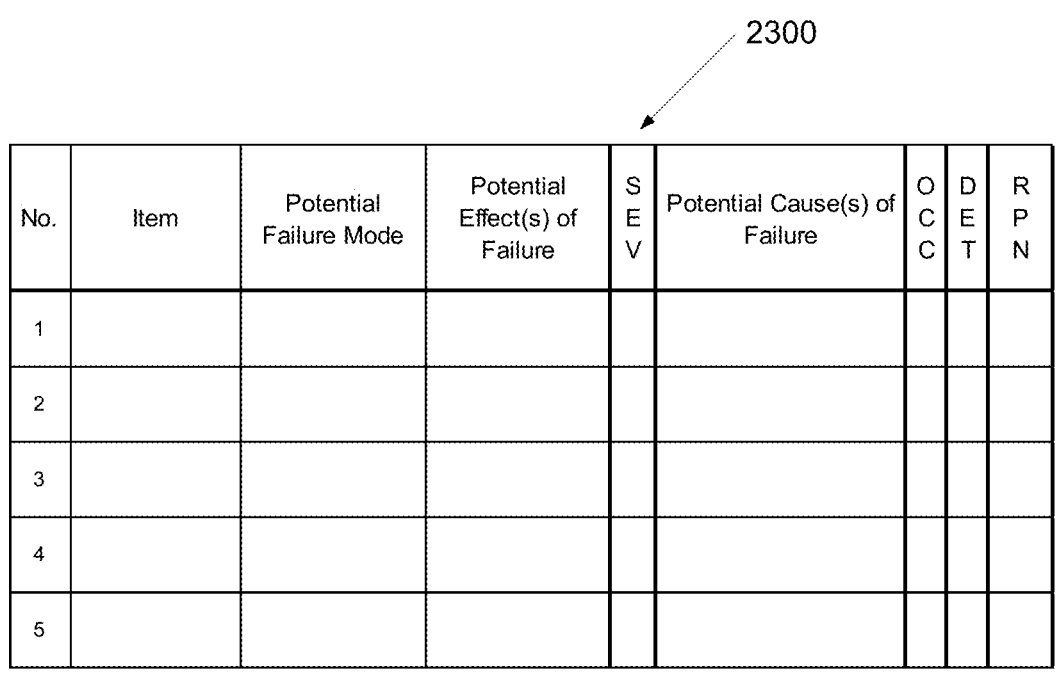
FIG. 23 is a diagram illustrating an example Failure Mode and Effects Analysis (FMEA) template.
Figure 29:
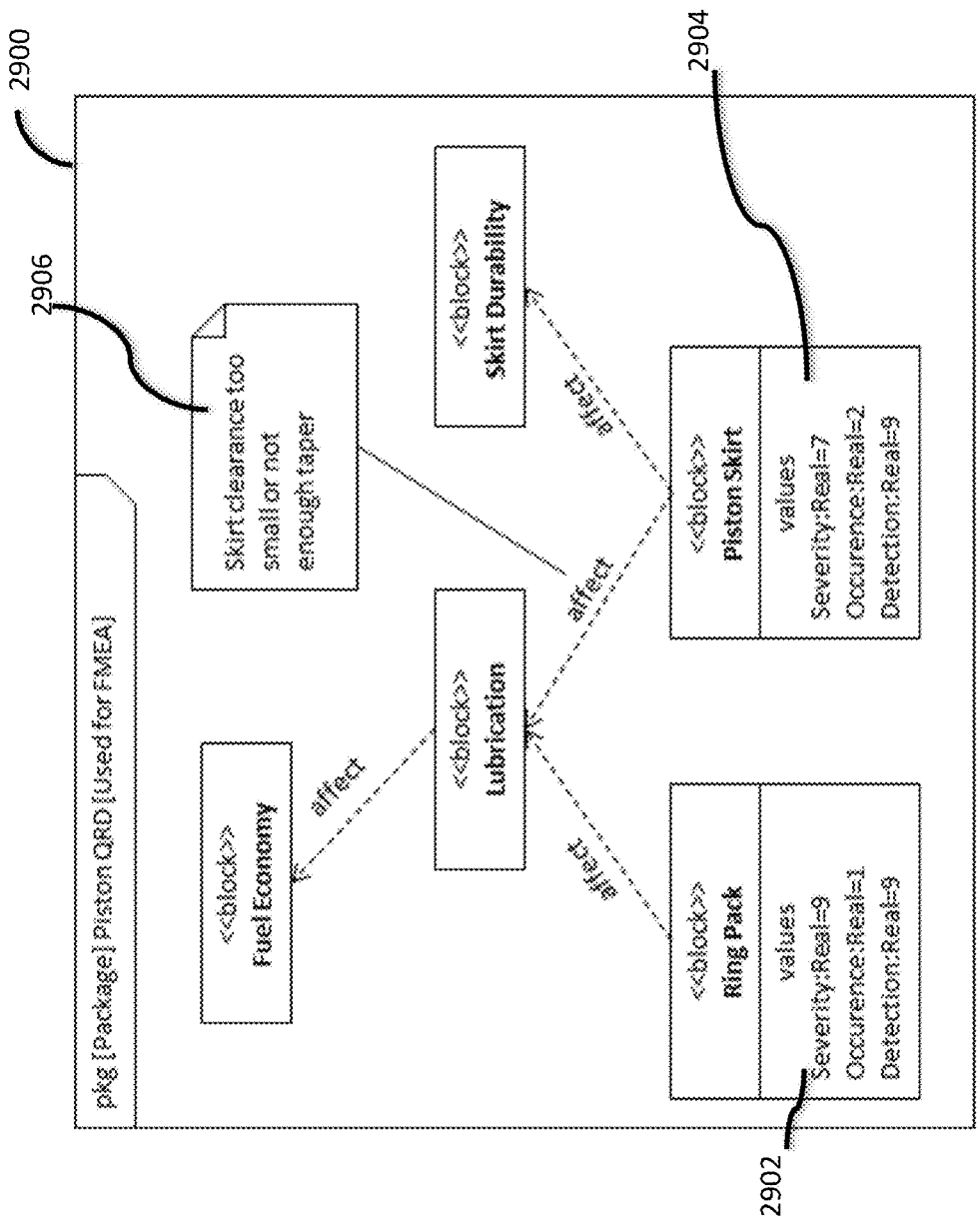
FIG. 29 illustrates an OMG SysML diagram with value compartments.

FMEA and FMECA answer the questions (1) what part of a system can fail (the failure mode), (2) what are consequences should failure occur (the effects), and (3) quantitatively, what are the odds of failures, and the priorities of fixing or avoiding each failure mode (analysis). Thus, knowing the children of a node in the model tree provides the information as to what can go wrong should a node fail. That information can be propagated downstream to all descendants or upstream to parent of the failed node, and the results entered into an FMEA template, such as an example template 2300 shown in FIG. 23. An FMEA table can be implemented in a spreadsheet environment using parent-child information that is readily available in package and block definition diagrams. For example, if an OMG SysML diagram specifies that a subsystem A works if, and only if, its parts A1, A2, A3 work, then the failure of A1, a child node, would be entered as a failure mode. The failure of parent A would be entered as an "effect." If A in turn is a child of another node, say B1, then B1 and its parent, if any, would be listed as failure effects. FIG. 29 shows an example OMG SysML diagram 2900, where failure of either the ring pack or the piston skirt will lead to the failure of fuel economy because the vehicle will not be able to meet fuel economy standards. Value compartments 2902 and 2904 are used to denote the consequence severity (SEV) of a failure mode, the likelihood of its occurrence (OCC), and the ease of detection (DET). A callout 2906 attached to an "affect" relationship can be used to populate the probable cause column in FIG. 23. The Risk Priority Number (RPN) can be easily calculated from SEV, OCC, and DET columns in FIG. 23 using cell equations.

Figure 24:
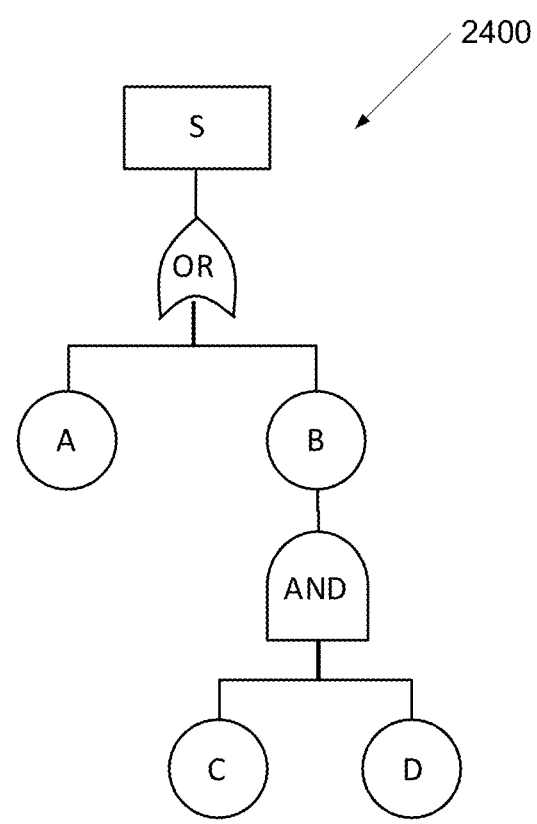
FIG. 24 is an example fault tree.

FTA depicts in a graphical format the chain of events that can lead to system failure. A simple example of a fault tree 2400 is shown in FIG. 24, which states that system S fails if event A or B occurs, and B occurs if events C and D occur. Thus, system S fails if A occurs, or both C and D occur. The probability of system S failing can be ascribed if the probabilities of A, C, and D occurring are known. Fault Tree Analysis is similar to FMEA, in that the failure of a child node can lead to the failure of its parent, depending on the reliability redundancy built into the system. In the example shown in FIG. 23, C failing will cause B to fail if D also fails. The icons and connections used in a typical fault tree diagram are not included in SysML specifications. However, they can be easily done with shapes in a spreadsheet environment. Information embedded in those shapes can be extracted and used in ways similar to those disclosed under the aforementioned U.S. patent application Ser. No. 13/040,417. For example, in the example shown in FIG. 23, the child-parent relationship can be deduced in a way similar to that used in a containment relationship in a SysML package diagram. The probability of an event occurring for a parent node can then be obtained by applying the parallel or series law of reliability calculation to the children.

Figure 25:
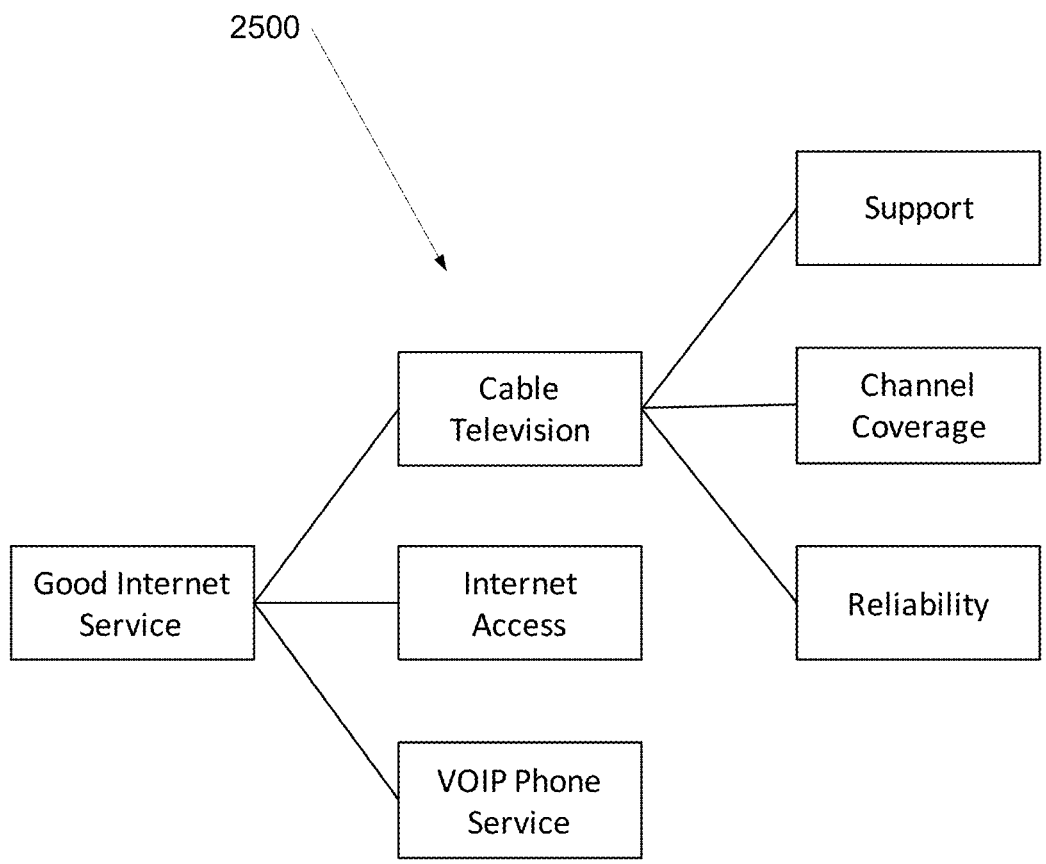
FIG. 25 is an example Critical To Quality (CTQ) tree.

CTQ decomposes the Voice Of the Customer (VOC) into key MoE's in a tree-like fashion. An example CTQ tree 2500 is shown in FIG. 25, which shows "Good Internet Service" provided by an Internet Service Provider being decomposed into the three typical service components. A customer will rate the service as "good" if all three components are good. Most CTQ trees are qualitative in that they provide a visual aid in understanding what is important to the customer. For a CTQ tree to be more useful, the VOC and its components must be quantified. Furthermore, a calculation method must be devised to "roll the numbers up" from the components to the VOC. Such a calculation method can be fashioned after the fault tree 2400 shown in FIG. 24, where the "AND" and "OR" gates are used to roll the probability numbers up from the components A, C, D to the parent S. For CTQ, the VOC can be measured by a number between 0 and 1, where 1 signifies that the a customer is completely satisfied. Similarly, the contributions from the components can be measured by a number between 0 and 1. Then, instead of AND and OR gates, an aggregator can be used to roll the numbers the up. For example, a weighted sum can be used to measure the degree of satisfaction, $s=\Sigma_i w_i x_i$, where the weights $w_i$ are adjusted so s is between 0 and 1. A quantitative CTQ tree is useful for identifying the key contributors to customer satisfaction. The partial derivative $$\frac{ds}{dx_i}$$

for example, gives the sensitivity of customer satisfaction relative to the component $x_i$. A CTQ tree can be constructed from connected shapes in the EXCEL® spreadsheet environment in a similar way as FTA tree.

Use of Templates in An Enterprise

For sharing work across an enterprise, it is beneficial to persist a template and its instances in a database such that multiple users can simultaneously access and update different parts of the workbook under access control. Accordingly, portions of the workbook can be selectively checked out so that access to them is restricted to users who are currently accessing or updating such portions. When a user has finished accessing or updating a checked out portion of a workbook, the user can check that portion of the workbook in so that other users can access or update it. Such fine grain check in/check out capabilities at the worksheet or diagram level is important since locking out an entire workbook, which can be done in some conventional spreadsheet environments, will severely limit the availability of a workbook. For example, locking out an entire workbook may restrict access to worksheets that are not being accessed or updated by a user, thereby limiting the ability of the user's colleagues to access or update such worksheets. Several alternatives are available for choosing a database. Since workbooks in the EXCEL® spreadsheet environment are already stored as zipped XML files, they can easily be stored in a native XML database. Tools such as XPath and XQuery can then be used to perform usual database functions, for example, to query the database and update the required data. In particular the functions can be applied to shapes information stored in a workbook's drawings folder. Storing the workbooks in a native XML database has the advantage that clients other than the EXCEL® spreadsheet environment may be used to interface with the user, thus providing cross-platform functionality.

Figure 26:
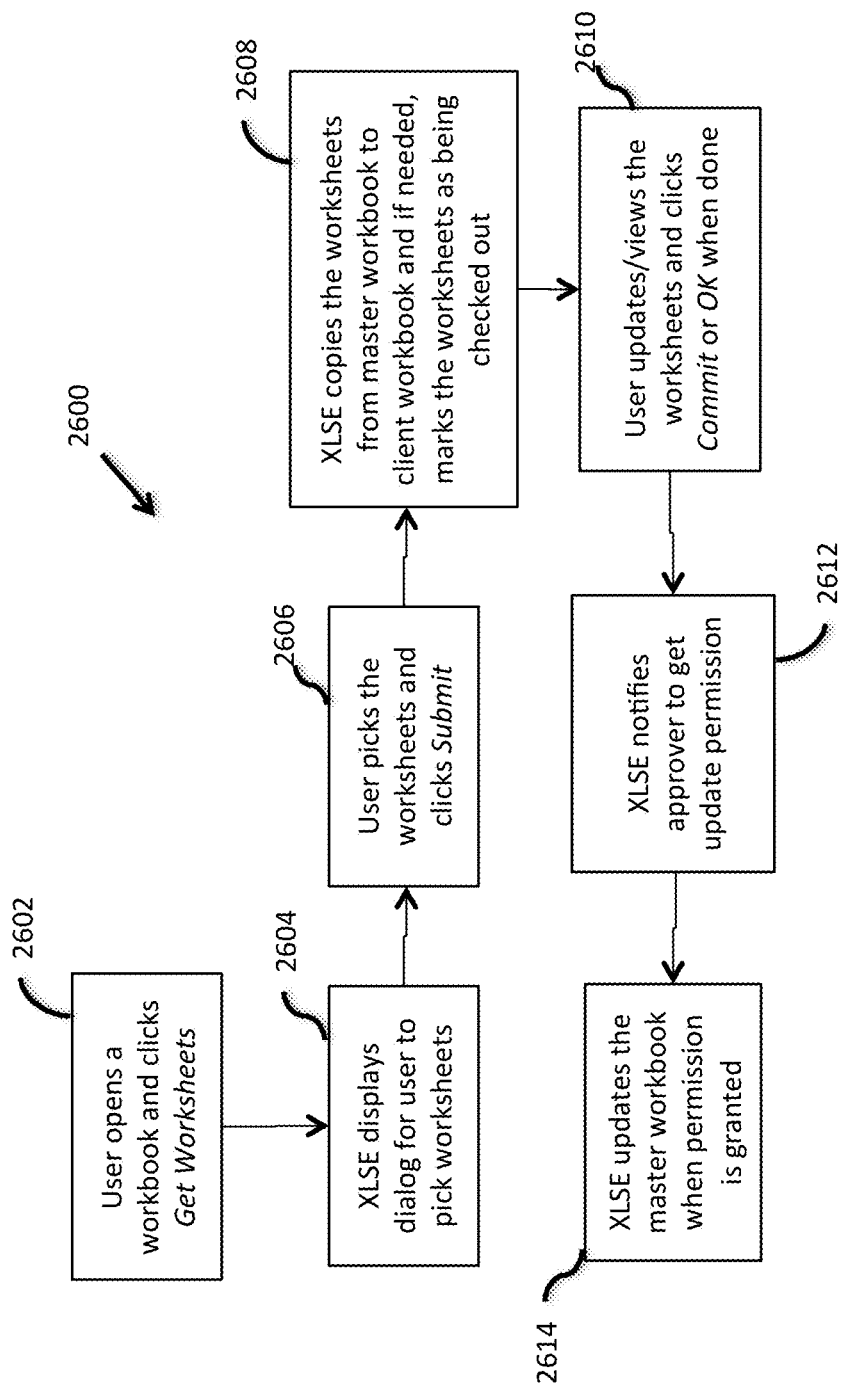
FIG. 26 is a flow diagram illustrating an example process for viewing or updating worksheets in a master workbook.

Alternatively, a file system in a remote location may be used to store the workbooks. In this scenario the template and its instances are stored as master workbooks in a physical drive that is always connected, or "mounted," to the network. The master workbooks are protected so that they can be accessed only programmatically from the XLSE add-in, or manually with proper authorization. FIG. 26 shows an example process 2600 for viewing or updating worksheets in a master workbook. At a step 2602, the user clicks a command button to start the process. The XLSE add-in responds at a step 2604 by displaying a dialog that includes a list of worksheets that the user can select from. In addition to the worksheet name, information can be displayed to indicate, for example, the workbook in which a sheet is located, the workbook owner, and whether the sheet has been checked out. Information that can be gleaned from OMG SysML diagrams contained in the worksheets, e.g., product program and functional area may also be displayed. The XLSE add-in will maintain a worksheet information file that contains the additional information. Dependency of worksheets that results, for example, from the use of hyperlinks, can also be determined programmatically and displayed to the user. The user may then decide to check out one or more inter-dependent worksheets for viewing or update at a step 2606. The XLSE add-in will lock down all inter-dependent worksheets even if the user selects only some of the sheets. Dependency information can also be included in the worksheet information file.

After the user makes the selection and clicks an OK or Submit button, the XLSE add-in will programmatically copy the selected worksheets to the client workbook and, if necessary, update the worksheet information file to indicate the worksheets have been checked out at a step 2608. Worksheets that have been previously checked out can be copied for viewing, but they will be protected from update by programmatically invoking native worksheet protection capability in the spreadsheet environment. After the user makes the changes and clicks an OK or Commit button at a step 2610, the XLSE add-in will copy the worksheets back to the remote file system. The worksheets in the client workbook may be closed without saving, or the user may be given a chance to save a local copy. Workflow may be added in which approval is required from a supervisor before the master workbook is updated. If approval is required, the supervisor can be notified by email and be directed to view the pending worksheets at a step 2612. To prevent a person from locking out worksheets for an unduly amount of time, the XLSE add-in can enforce a time out. To implement workflow and time out, approval status and related information such as date and time may be added to the worksheet information file. When update permission has been granted, the XLSE add-in updates the master workbook at a step 2614.

Model information depicted in OMG SysML diagrams may serve as the basis for designing a product lifecycle management database. For example, the OMG SysML <<block>> modeling component with the appropriate compartments can be used to represent a class model that can later be transformed into a relational data model. The transformation is done by many commercially available UML tools, such as IBM'S RATIONAL® software. Also, as in UML, OMG SysML's Association path denotes a parent-child relationship with role and multiplicity, which, together with OMG SysML parameters, can be transformed into tables and fields in a relational data model. Finally, as in UML, OMG SysML's behavior constructs in par, act, ibd and stm diagrams can be transformed into constraints, triggers and stored procedures in a relational data model. That many of OMG SysML stereotypes and semantics closely parallel UML is no surprise since the former is a profile (dialect) of the latter. Thus, just as a spreadsheet environment can be used to draw OMG SysML models and diagrams, it can also be used to draw UML diagrams. One skilled in the art will be able to transform OMG SysML diagrams drawn with graphical objects in a spreadsheet environment into UML class models that are also drawn with graphical objects in the spreadsheet environment.

Figure 27:
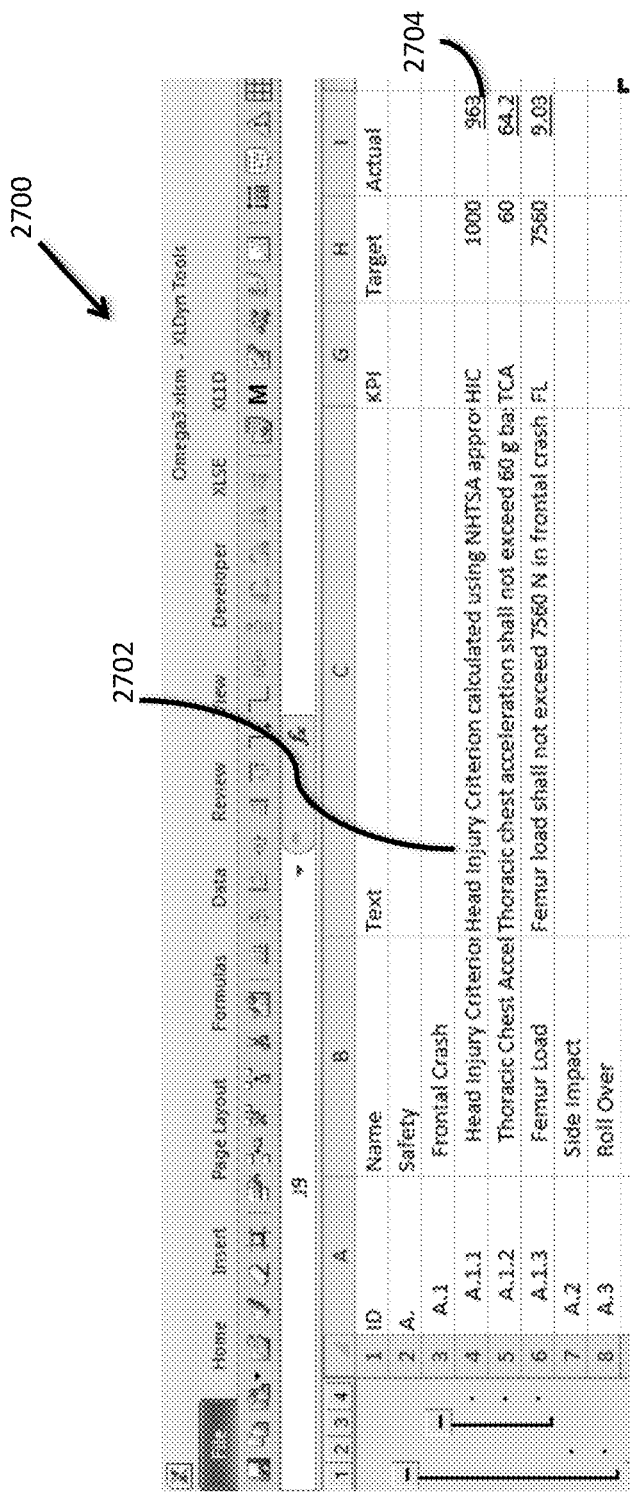
FIG. 27 is a diagram illustrating an example table in which requirements with target values have been retrieved from a database.

Once the database is designed and deployed, it can be populated and queried by using a number of database management tools, including the EXCEL® spreadsheet environment itself as well as third-party commercially available and open-source applications. Regardless of which database management tool is used, it may be advantageous to display query results as tables in the spreadsheet environment, which may be in the same workbook that contains the OMG SysML models. The user can then edit and update the tables and use them to update the external database. In particular, calculation results obtained from using cells formulae, macros, third-party simulation applications launched from a command button as mentioned earlier, and other tools in the spreadsheet environment can be used to update the tables. FIG. 27 shows an example table 2700 in which requirements 2702 with associated target values (column H) have been retrieved from a database and displayed as a table in the spreadsheet environment. Macros can be written to insert actual values from simulation into the table 2700 (column I). In some embodiments, any deviations between target values and actual values can be indicated by formatting the relevant cells red, yellow, or green. Hyperlinks 2704 can be inserted so the user can navigate to the simulation results.

As demonstrated by the foregoing discussion, various embodiments may provide certain advantages, particularly in the context of modeling collections of disparate systems, which may include, for example, one-dimensional dynamic systems, multi-body dynamic or kinematic systems, and/or business systems, and executing the contents modeled by those systems. For example, using a spreadsheet environment, such as Microsoft's EXCEL® spreadsheet environment, as a GUI has a relatively quick learning curve and facilitates modeling and executing systems of systems. The user can add instances of building blocks to the canvas and copy, cut, paste, connect, align, and distribute building blocks, all with familiar mouse and/or keyboard commands. Familiar commands can also be used to perform spell checking and other language-related functions. When spreadsheet environment, such as Microsoft's EXCEL® spreadsheet environment is used to model dynamic systems, and such models are included in the same workbook, the user has the advantage of being able to plot analysis results and create charts from the same environment. Simulation artifacts can be easily included as part of the system documentation.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A method of modeling a system comprising a plurality of components, the method comprising:
    using a computer to provide a spreadsheet environment;
    defining a plurality of shape objects within the spreadsheet environment, the shape objects representing the components of the system, wherein at least one component is a subsystem comprising a plurality of elements;
    using an add-in in the spreadsheet environment that provides user interface elements in the spreadsheet environment to manage the shape objects, relationships between the shape objects, and data associated with a system model in the spreadsheet environment, wherein at least one of the relationships between the shape objects comprises a connection between at least two shape objects defined using a graphic connector element having a property comprising respective identities of the at least two shape objects;
    using the spreadsheet environment to interact with a plurality of applications for working with the system;
    using the spreadsheet environment to generate a plurality of diagrams of the system in a graphical system modeling language;
    using the spreadsheet environment to diagram a plurality of system models for system simulation, process automation, and performance index calculations;
    using a macro in the spreadsheet environment to perform at least one action on at least one of the system models; and
    storing the system model using a templated workbook in the spreadsheet environment, the templated workbook comprising data representing a physical view and a functional view of the system model.

2. The method of claim 1, further comprising persisting the templated workbook in a database.

3. The method of claim 2, further comprising checking in and removing an access restriction to the portion of the templated workbook.

4. The method of claim 1, further comprising checking out and restricting access to a portion of the templated workbook.

5. The method of claim 1, further comprising using the spreadsheet environment to define a callout representing a dependency relationship.

6. The method of claim 1, further comprising providing data from the system model to a system engineering tool.

7. A method of modeling a system comprising a plurality of components, the method comprising:
    using a computer to provide a spreadsheet environment;
    defining a plurality of shape objects within the spreadsheet environment, the shape objects representing the components of the system, wherein at least one component is a subsystem comprising a plurality of elements;
    using an add-in in the spreadsheet environment that provides user interface elements in the spreadsheet environment to manage the shape objects, relationships between the shape objects, and data associated with a system model in the spreadsheet environment, wherein at least one of the relationships between the shape objects comprises a connection between at least two shape objects defined using a graphic connector element having a property comprising respective identities of the at least two shape objects;
    using the spreadsheet environment to interact with a plurality of applications for working with the system;
    using the spreadsheet environment to generate a plurality of diagrams of the system in a graphical system modeling language;
    using the spreadsheet environment to diagram a plurality of system models for dynamic system simulation, process automation, and performance index calculations;
    using a macro in the spreadsheet environment to perform at least one action on at least one of the system models;
    storing the system model using a templated master workbook in the spreadsheet environment, the templated master workbook comprising a plurality of worksheets;
    receiving a user selection of the templated master workbook and a worksheet of the plurality of worksheets; and
    copying the selected worksheet to a client workbook.

8. The method of claim 7, further comprising marking the selected worksheet as being checked out.

9. The method of claim 7, further comprising receiving an update to the selected worksheet and updating the client workbook.

10. The method of claim 9, further comprising requesting approval of the update to the selected worksheet.

11. The method of claim 10, further comprising, in response to receiving approval of the update to the selected worksheet, updating the templated master workbook.

12. The method of claim 7, further comprising storing status information regarding whether a worksheet is checked in or checked out.

13. A computer system comprising:
    a processor configured to receive and to execute processor-executable instructions;
    a memory device in communication with the processor and storing processor-executable instructions that, when executed by the processor, cause the processor to model a system comprising a plurality of components by
    using the processor to provide a spreadsheet environment;
    defining a plurality of shape objects within the spreadsheet environment, the shape objects representing the components of the system, wherein at least one component is a subsystem comprising a plurality of elements;

using an add-in in the spreadsheet environment that provides user interface elements in the spreadsheet environment to manage the shape objects, relationships between the shape objects, and data associated with a system model in the spreadsheet environment, wherein at least one of the relationships between the shape objects comprises a connection between at least two shape objects defined using a graphic connector element having a property comprising respective identities of the at least two shape objects;

using the spreadsheet environment to interact with a plurality of applications for working with the system;

using the spreadsheet environment to generate a plurality of diagrams of the system in a graphical system modeling language;

using the spreadsheet environment to diagram a plurality of system models for system simulation, process automation, and performance index calculations;

using a macro in the spreadsheet environment to perform at least one action on at least one of the system models; and storing the system model using a templated workbook in the spreadsheet environment, the templated workbook comprising data representing a physical view and a functional view of the system model.

14. The computer system of claim 13, the memory device storing further processor-executable instructions for persisting the templated workbook in a database.

15. The computer system of claim 14, the memory device storing further processor-executable instructions for checking in and removing an access restriction to the portion of the templated workbook.

16. The computer system of claim 13, the memory device storing further processor-executable instructions for checking out and restricting access to a portion of the templated workbook.

17. The computer system of claim 13, the memory device storing further processor-executable instructions for using the spreadsheet environment to define a callout representing a dependency relationship.

18. The computer system of claim 13, the memory device storing further processor-executable instructions for providing data from the system model to a system engineering tool.

19. A computer system comprising:
a processor configured to receive and to execute processor-executable instructions;
a memory device in communication with the processor and storing processor-executable instructions that, when executed by the processor, cause the processor to model a system comprising a plurality of components by
using a computer to provide a spreadsheet environment;
defining a plurality of shape objects within the spreadsheet environment, the shape objects representing the components of the system, wherein at least one component is a subsystem comprising a plurality of elements;

using an add-in in the spreadsheet environment that provides user interface elements in the spreadsheet environment to manage the shape objects, relationships between the shape objects, and data associated with a system model in the spreadsheet environment, wherein at least one of the relationships between the shape objects comprises a connection between at least two shape objects defined using a graphic connector element having a property comprising respective identities of the at least two shape objects;

using the spreadsheet environment to interact with a plurality of applications for working with the system;

using the spreadsheet environment to generate a plurality of diagrams of the system in a graphical system modeling language;

using the spreadsheet environment to diagram a plurality of system models for dynamic system simulation, process automation, and performance index calculations;

using a macro in the spreadsheet environment to perform at least one action on at least one of the system models;

storing the system model using a templated master workbook in the spreadsheet environment, the templated master workbook comprising a plurality of worksheets;

receiving a user selection of the templated master workbook and a worksheet of the plurality of worksheets; and copying the selected worksheet to a client workbook.

20. The computer system of claim 19, the memory device storing further processor-executable instructions for marking the selected worksheet as being checked out.

21. The computer system of claim 19, the memory device storing further processor-executable instructions for receiving an update to the selected worksheet and updating the client workbook.

22. The computer system of claim 21, the memory device storing further processor-executable instructions for requesting approval of the update to the selected worksheet.

23. The computer system of claim 22, the memory device storing further processor-executable instructions for, in response to receiving approval of the update to the selected worksheet, updating the templated master workbook.

24. The computer system of claim 19, the memory device storing further processor-executable instructions for storing status information regarding whether a worksheet is checked in or checked out.

* * * * *